(12) United States Patent
Malmali et al.

(10) Patent No.: US 10,287,173 B2
(45) Date of Patent: May 14, 2019

(54) PROCESS FOR MAKING AMMONIA

(71) Applicant: REGENTS OF THE UNIVERSITY OF MINNESOTA, Minneapolis, MN (US)

(72) Inventors: Mohammadmahdi Malmali, Minneapolis, MN (US); Alon V. McCormick, Minneapolis, MN (US); Edward L. Cussler, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 96 days.

(21) Appl. No.: 15/432,236

(22) Filed: Feb. 14, 2017

(65) Prior Publication Data
US 2017/0152149 A1  Jun. 1, 2017

Related U.S. Application Data

(63) Continuation-in-part of application No. 14/535,491, filed on Nov. 7, 2014, now Pat. No. 9,914,645.
(Continued)

(51) Int. Cl.
*C01C 1/04* (2006.01)
*B01J 8/00* (2006.01)
(Continued)

(52) U.S. Cl.
CPC .......... *C01C 1/0458* (2013.01); *B01D 53/047* (2013.01); *B01D 53/0462* (2013.01);
(Continued)

(58) Field of Classification Search
CPC .... B01J 8/0005; C01C 1/0405; C01C 1/0458; C01C 1/006
See application file for complete search history.

(56) References Cited

U.S. PATENT DOCUMENTS 3,287,086 A   11/1966 Cahn
5,711,926 A   1/1998 Knaebel
(Continued)

FOREIGN PATENT DOCUMENTS

EP   1992397 A1   11/2008
JP   06-136357 A   5/1994
(Continued)

OTHER PUBLICATIONS

Christensen, Claus H., et al., "Metal ammine complexes for hydrogen storage", Journal of Materials Chemistry, 15, (2005), 4106-4108.
(Continued)

*Primary Examiner* — Lessanework Seifu
(74) *Attorney, Agent, or Firm* — Quarles & Brady LLP

(57) ABSTRACT

An ammonia-producing system comprises a reactor that catalytically converts nitrogen and hydrogen feed gases to ammonia to form a reaction mixture of the ammonia, unreacted nitrogen gas, and unreacted hydrogen gas. A feed system feeds the nitrogen and hydrogen gases to the reactor at a reaction pressure of from about 9 to about 100 atmospheres. A reactor control system controls the temperature during conversion of the nitrogen and hydrogen to ammonia by maintaining a reaction temperature of from about 330° C. to about 550° C. An absorbent selectively absorbs at least a portion of the ammonia from the reaction mixture, and an absorbent control system controls one or both of a temperature and pressure at the absorbent during selective absorption of the ammonia from the reaction mixture. A recycle line downstream of the absorbent recycles the unreacted nitrogen and unreacted hydrogen to the reactor.

20 Claims, 13 Drawing Sheets

Related U.S. Application Data

(60) Provisional application No. 61/901,128, filed on Nov. 7, 2013.

(51) Int. Cl.
*C01C 1/00* (2006.01)
*B01D 53/04* (2006.01)
*B01D 53/047* (2006.01)

(52) U.S. Cl.
CPC .............. *B01J 8/0005* (2013.01); *C01C 1/006* (2013.01); *C01C 1/0417* (2013.01); *C01C 1/0447* (2013.01); *B01D 2253/112* (2013.01); *B01D 2257/406* (2013.01); *B01D 2259/402* (2013.01); *B01D 2259/4002* (2013.01); *B01D 2259/40009* (2013.01); *B01D 2259/40013* (2013.01); *B01D 2259/40028* (2013.01); *Y02P 20/52* (2015.11)

(56) References Cited

U.S. PATENT DOCUMENTS

| | | | |
|---|---|---|---|
| 7,879,138 B2 * | 2/2011 | Lee | B01D 53/047 95/103 |
| 8,578,702 B2 | 11/2013 | Johannessen et al. | |
| 2010/0266475 A1 | 10/2010 | Johansen et al. | |
| 2011/0073806 A1 | 3/2011 | Svagin et al. | |
| 2012/0072135 A1 | 3/2012 | Quaade | |
| 2012/0231949 A1 | 9/2012 | Svagin et al. | |
| 2013/0263927 A1 | 10/2013 | Johannessen | |
| 2015/0125377 A1 | 5/2015 | Himstedt et al. | |

FOREIGN PATENT DOCUMENTS

| | | |
|---|---|---|
| WO | WO-2005/091418 A2 | 9/2005 |
| WO | WO-2006/012903 A2 | 2/2006 |
| WO | WO-2006/081824 A2 | 8/2006 |
| WO | WO-2007/000170 A1 | 1/2007 |
| WO | WO-2007/095955 A1 | 8/2007 |
| WO | WO-2008/077652 A2 | 7/2008 |
| WO | WO-2008/092500 A1 | 8/2008 |
| WO | WO-2008/119492 A1 | 10/2008 |
| WO | WO-2010/025947 A1 | 3/2010 |
| WO | WO-2010/025948 A1 | 3/2010 |
| WO | WO-2010/040595 A1 | 4/2010 |
| WO | WO-2010/105833 A1 | 9/2010 |
| WO | WO-2011/103968 A2 | 9/2011 |
| WO | WO-2011/113454 A1 | 9/2011 |
| WO | WO-2011/113593 A1 | 9/2011 |
| WO | WO-2011/144348 A1 | 11/2011 |
| WO | WO-2012/034706 A1 | 3/2012 |
| WO | WO-2016/162123 A1 | 10/2016 |

OTHER PUBLICATIONS

Himstedt, Heath H., et al., "Ammonia Synthesis Enhanced by Magnesium Chloride Absorption", AIChE Journal, 61(4), (Apr. 2015), 1364-1371.

Huberty, Mark S., et al., "Ammonia Absorption at Haber Process Conditions", AIChE Journal, 58(11), (Nov. 2012), 3526-3552.

Hummelshoj, Jens S., et al., "Generation of Nanopores during Desorption of NH3 from Mg(NH3)6Cl2", J. Am. Chem. Soc., 128, (2006), 16-17.

Jones, Martin O., et al., "The structure and desorption properties of the ammines of the group II halides", Chemical Physics, 427, (2013), 38-43.

Klerke, Asbjorn, et al., "Ammonia for hydrogen storage: challenges and opportunities", Journal of Materials Chemistry, vol. 18, No. 20, (2008), 2304-2310.

Liu, Chun Yi, et al., "Absorption and Desorption Behavior of Ammonia with Alkali Earth Halide", Chemistry Letters, 31, (2002), 798-799.

Liu, Chun Yi, et al., "Ammonia Absorption into Alkaline Earth Metal Halide Mixtures as an Ammonia Storage Material", Ind. Eng. Chem. Res., 43, (2004), 7484-7491.

Liu, Chun Yi, et al., "Ammonia Absorption on Alkaline Earth Halides as Ammonia Separation and Storage Procedure", Bull. Chem. Soc. Jpn., 77, (2004), 123-131.

Reese, Michael, et al., "Performance of a Small-Scale Haber Process.", Industrial & Engineering Chemistry Research, vol. 55, (2016), 3742-3750.

Sharonov, Vastly E., et al., "Ammonia Adsorption by MgCl2, CaCl2 and BaCl2 Confined to Porous Alumina: The Fixed Bed Adsorber", React.Kinet.Catal.Lett., 85(1), (2005), 183-188.

Sorensen, Rasmus Z., et al., "Indirect, reversible high-density hydrogen storage in compact metal ammine salts", Journal of the American Chemical Society, vol. 130, (2008), 8660-8668.

Tekin, Adem, et al., "Ammonia dynamics in magnesium ammine from DFT and neutron scattering", Energy & Environmental Science, 3, (2010), 448-456.

Van Hassel, Bart A., et al., "Ammonia sorbent development for on-board H2 purification", Separation and Purification Technology, vol. 142, (2015), 215-226.

"AdAmmine™", © 2004-2016 Amminex Emissions Technology A/S [online]. [retrieved on Nov. 10, 2016]. Retrieved from the Internet: <URL: http://amminex.dk/technology/the-solid.aspx>, (2016), 1 pg.

"U.S. Appl. No. 14/535,491, Non Final Office Action dated Jul. 28, 2017", 13 pgs.

"U.S. Appl. No. 14/535,491, Response filed Oct. 30, 2017 to Non Final Office Action dated Jul. 28, 2017", 13 pgs.

Chakraborty, Debasish, "Solid ammonia storage technology for fuel cell systems", 2007 NH3 Fuel Conference, [online]. [retrieved on Nov. 10, 2016]. Retrieved from the Internet: <URL: https://nh3fuel.files.wordpress.com/2012/05/chakraborty_nh3.pdf (accessed Nov. 10, 2016), (2007), 49 pgs.

Christensen, Rune, et al., "Identifying systematic DFT errors in catalytic reactions", Catal. Sci. Technol., 5, (2015), 4946-4949.

Johannessen, Tue, ""Solidified" ammonia as energy storage material for fuel cell applications", 2007 Annual NH3 Fuel Conference, [online]. [retrieved on Nov. 10, 2016]. Retrieved from the Internet: <URL: http://nh3fuel.files.wordpress.com/2012/05/amminex_jonhannessen.pdf>, (2007), 20 pgs.

Petersen, Henrik N., et al., "Solid Ammonia as Energy Carrier: Possibilities and Technology Development", 2008 Annual NH3 Fuel conference, [online]. [retrieved on Nov. 10, 2016]. Retrieved from the Internet: <URL: https://nh3fuel.files.wordpress.com/2012/05/amminex_2008.pdf>, (2008), 11 pgs.

* cited by examiner

PROCESS FOR MAKING AMMONIA

CROSS-REFERENCE TO RELATED APPLICATIONS

This application is a continuation-in-part (CIP) of application Ser. No. 14/535,491, filed on Nov. 7, 2014, entitled "PROCESS FOR MAKING AMMONIA," which is pending, and which claims priority under 35 U.S.C. § 119(e) to U.S. Provisional Application Ser. No. 61/901,128, filed on Nov. 7, 2013, entitled "PROCESS FOR MAKING AMMONIA," the disclosures of which are incorporated herein by reference in their entirety.

BACKGROUND

Ammonia ($NH_3$) is one of the world's most important chemicals. In addition to its primary use in fertilizers, ammonia can also be used as an efficient coolant or a clean, effective fuel. Manufacturing ammonia has remained surprisingly unchanged for over a century. The Haber-Bosch process has been the predominant process for making ammonia since the early twentieth century. The Haber-Bosch process involves using high pressures and temperatures in large, capital-intensive plants by combining nitrogen gas ($N_2$) and hydrogen gas ($H_2$) over an iron-based catalyst. Although the Haber-Bosch process has undergone decades of optimization, ammonia production still remains limited by thermodynamics to typically less than 20% conversion in a single pass. Once ammonia is produced, it is separated from unreacted $N_2$ and $H_2$, which must then be repressurized, reheated, and recycled. This requires tremendous capital expenditures and a large amount of energy. Haber-Bosch plants account for about 1.5% of global energy consumption. Moreover, the hydrogen gas used in the Haber-Bosch process is typically obtained by steam reforming of natural gas, which releases additional $CO_2$ into the atmosphere.

SUMMARY OF THE INVENTION

The present disclosure describes systems and methods for producing ammonia. The system can comprise a reactor comprising a catalyst for converting nitrogen gas and hydrogen gas to gaseous ammonia. The system can further comprise an absorber comprising a magnesium chloride absorbent for the selective absorption of produced gaseous ammonia. The absorber can be downstream of the reactor to absorb ammonia from a reactor exit stream. The system can further include a recycle line for recycling the absorber exit gas, which can include unabsorbed ammonia and unreacted hydrogen and nitrogen gasses. The recycled absorber exit gas can be fed back into the reactor for further reaction of the nitrogen gas and hydrogen gas in the absorber exit gas. After absorption of the ammonia into the magnesium chloride absorbent is complete, the pressure in the absorber can be reduced to cause desorption of ammonia from the magnesium chloride absorbent.

In an example, the present disclosure describes a system for producing ammonia, the system comprising a reactor configured to receive a nitrogen feed gas ($N_2$) and a hydrogen feed gas ($H_2$), the reactor comprising a catalyst that converts at least a portion of the nitrogen gas and at least a portion of the hydrogen feed gas to ammonia ($NH_3$) to form a reaction mixture comprising the ammonia, unreacted nitrogen feed gas, and unreacted hydrogen feed gas. The system also includes a reactor control system to control the temperature of the reactor during conversion of the nitrogen feed gas and the hydrogen feed gas to the ammonia. The reactor control system is configured to maintain a reaction temperature of the reaction mixture at from about 330° C. to about 500° C. The system further includes an absorbent that selectively absorbs at least a portion of the ammonia from the reaction mixture. An absorbent control system controls one or both of a temperature and a pressure at the absorbent during selective absorption of the ammonia from the reaction mixture. The system also includes a recycle line downstream of the absorbent to recycle the unreacted nitrogen feed gas and the unreacted hydrogen feed gas to the reactor.

In some examples, the system further comprises a product line downstream of the absorbent and separate from the recycle line and one or more flow control devices to direct gas flow to either the recycle line or the product line. In these examples, the absorbent control system is configured to cycle between an absorption phase and a desorption phase, wherein the absorbent control system maintains one or both of a first temperature and a first pressure at the absorbent that is conducive to absorption of ammonia into the absorbent during the absorption phase and maintains one or both of a second temperature and a second pressure at the absorbent that is conducive to desorption of ammonia from the absorbent during the desorption phase. In these examples, the one or more flow control devices direct the gas flow of unreacted nitrogen feed gas and unreacted hydrogen feed gas to the recycle line during the absorption phase and direct the gas flow of desorbed ammonia to the product line during the desorption phase.

In another example, the present disclosure describes a method for producing ammonia, the method comprising reacting at least a portion of a nitrogen feed gas ($N_2$) and at least a portion of a hydrogen feed gas ($H_2$) in the presence of a catalyst in a reactor while maintaining a reaction pressure of from about 10 atmospheres to about 100 atmospheres and a reaction temperature of from about 330° C. to about 550° C. to form ammonia ($NH_3$), wherein unreacted nitrogen gas ($N_2$), unreacted hydrogen gas ($H_2$), and the ammonia ($NH_3$) formed during the reaction form a reaction mixture. The method also includes cycling between an absorption phase and a desorption phase. The absorption phase comprises flowing at least a portion of the reaction mixture to an absorbent while maintaining one or both of an absorption pressure and an absorption temperature at the absorbent to selectively absorb at least a portion of the ammonia from the reaction mixture into the absorbent; and, following the selective absorbing, recycling unreacted nitrogen gas and unreacted hydrogen to the reactor. The desorption phase comprises changing one or both of the pressure at the absorbent to a desorption pressure or the temperature at the absorbent to a desorption temperature so that at least a portion of ammonia absorbed in the absorbent is desorbed from the absorbent; and withdrawing at least a portion of the ammonia desorbed from the absorbent as an ammonia product stream.

These and other examples and features of the present systems and methods will be set forth in part in the following Detailed Description. This Summary is intended to provide an overview of the present subject matter, and is not intended to provide an exclusive or exhaustive explanation. The Detailed Description below is included to provide further information about the present systems and methods.

BRIEF DESCRIPTION OF THE FIGURES

The drawings illustrate generally, by way of example, but not by way of limitation, various embodiments discussed in the present document.

DETAILED DESCRIPTION

Figure 1:
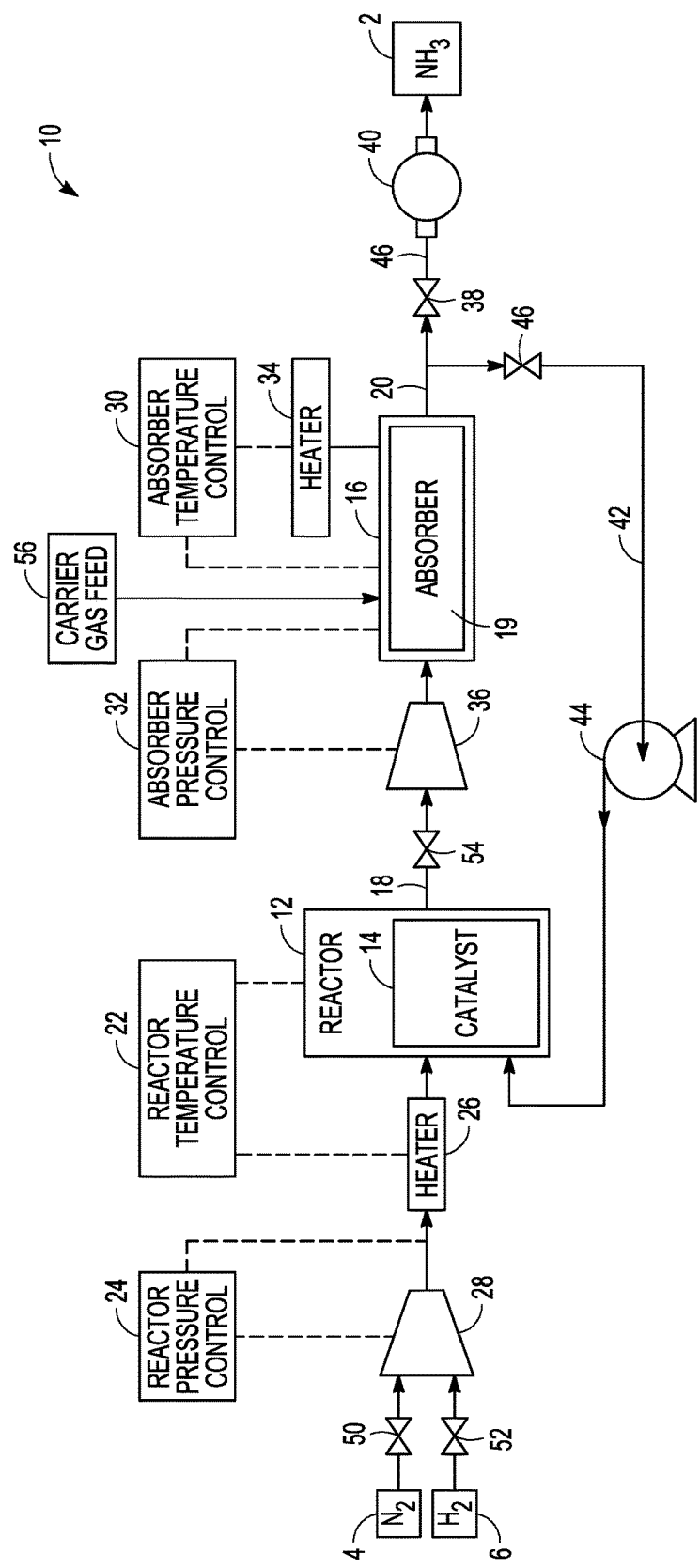
FIG. 1 is a schematic diagram of an example system for producing ammonia that includes a reactor that converts nitrogen gas and hydrogen gas to ammonia, and an absorber with an absorbent that selectively absorbs at least a portion of the ammonia produced in the reactor.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B. C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

System and Process for Making Ammonia

This disclosure describes systems and methods for ammonia production which can circumvent thermodynamic equilibrium and can provide for economical small-scale production. The systems and methods can utilize an absorbent material that selectively absorbs ammonia ($NH_3$) as it is formed while not absorbing, or absorbing much less of, unreacted hydrogen gas ($H_2$) and nitrogen gas ($N_2$) gas. In some examples, the absorbent material comprises a metal salt that selectively absorbs $NH_3$. The terms "selectively absorb," "selective absorption," "selective absorption affinity." or similar terms used herein refer to the absorbent having an affinity for one compound over another, in this case for the $NH_3$ product gas over the N2 and the $H_2$ reactant gases. Therefore, "selective absorption" of $NH_3$ with an absorbent refers to absorbing a substantially higher proportion of $NH_3$ present in the reaction product mixture into the absorbent while letting a substantially higher proportion the $N_2$ gas and the $H_2$ gas to pass through or by the absorbent. The absorbed ammonia can then be easily and rapidly released from the absorbent, for example by simply increasing the temperature or lowering the pressure.

The systems and methods of the present disclosure can combine traditional ammonia synthesis catalysts and the absorbent into a single system. As ammonia is produced in the catalytic reactor it can be selectively absorbed by the absorbent, reducing the amount of free ammonia present, and driving the reaction to a higher conversion percentage. The present inventors have discovered that it is possible to achieve greater than 90% conversion to ammonia in a single operation-much greater than the typical approximately 15%-20% conversion achieved in large Haber-Bosch commercial plants. The high conversion rate can reduce the magnitude of recycling needed for the process to be efficient, can provide for lower energy requirements, and can reduce capital costs. With this technology it may be possible to reduce the operating pressure and temperature, thus further reducing the energy requirements and the environmental impact of ammonia production compared to current Haber-Bosch plants.

In addition, because the systems and processes of the present invention can be achieved on a small scale compared to the Haber-Bosch process, it can be used to produce ammonia substantially on demand at the site where the ammonia is to be used. For example, if ammonia is desired as a fertilizer, a system in accordance with the present disclosure can be installed on or near a farm on which ammonia fertilizer will be used. The small-scale system of the present disclosure can, therefore, not only greatly reduce the capital and energy required to produce ammonia, as discussed above, but the system can also reduce or substantially eliminate fertilizer transportation costs, further reducing the energy requirements and the environmental impact of ammonia production.

FIG. 1 shows a schematic diagram of an example system 10 for the production of an ammonia ($NH_3$) $NH_3$ product 2 by reacting a nitrogen gas ($N_2$) feed 4 and a hydrogen gas ($H_2$) feed 6. The $N_2$ feed 4 and the $H_2$ feed 6 can be fed into the reactor 12 as two separate lines, as shown in FIG. 1, or as a single, common feed line (not shown). The $N_2$ feed 4 and the $H_2$ feed 6 can be fed into a catalytic reactor 12 comprising a bed of a catalyst 14.

The reactor 12 can be operated at conditions capable of providing for the conversion of $N_2$ gas from the $N_2$ feed 4 and the $H_2$ gas from the $H_2$ feed 6 to $NH_3$. For example, the reactor 12 can operate at typical Haber-Bosch conditions using a typical Haber-Bosch catalyst 14. In an example, the catalyst bed 14 can include, but is not limited to, an iron oxide based catalyst, such as magnetite ($Fe_3O_4$) or wüstite ($Fe^{[2+]}O$), or a ruthenium-based catalyst. The $N_2$ feed 4 and the $H_2$ feed 6 can be fed into the reactor 12 at a $H_2:N_2$ ratio of about 1.5:1 to 3.5:1, such as a $H_2:N_2$ molar ratio of about 3:1 (e.g., the stoichiometric ratio for the production of $NH_3$).

Conventionally, an industrial Haber-Bosch reaction is operated at a high temperature. e.g., at least about 400° C., in order to achieve good kinetics. However, such high temperatures reduce the conversion to ammonia that is possible. As used herein, the phrase "conversion to ammonia" or simply "conversion," when it is described using a percentage, refers to the percentage of the moles of nitrogen gas reactant ($N_2$) from the $N_2$ feed 4 that is converted to ammonia in the final $NH_3$ product line 2. It theoretically takes 0.5 moles of $N_2$ for every mole of $NH_3$ produced. Therefore, one method of determining a conversion includes determining the number of moles of $N_2$ being fed to the system 10 by the $N_2$ feed 4 (which can be expressed either as an absolute value of moles, e.g., in a batch process, or as a rate of moles of $N_2$ fed per unit of time, e.g., in a continuous or semi-continuous process), determining the number of moles of ammonia being withdrawn from the system 10 in the $NH_3$ product line 2 (which can also be expressed as an absolute value of moles, e.g., in a batch process, or as a rate of moles of $NH_3$ withdrawn per unit of time), and dividing the number of moles of $NH_3$ withdrawn from the system by twice the number of moles of $N_2$ fed to the system 10 and expressing the result as a percentage. For example, if $N_2$ is fed to the system 10 in the $N_2$ feed 4 at a rate of 10 moles/minute, and $NH_3$ is withdrawn from the system through the $NH_3$ product line 2 at a rate of 16 moles/minute, then the conversion of the system 10 is 80% (16 mol/min $NH_3$ divided by (2×10 mol/min $N_2$)=16/20=80%).

The overall conversion can be increased by applying high pressure, e.g., at least about 130 bar (about 128 atmospheres (atm)), and often as high as about 150 atm (about 152 bar) to about 300 atm (about 304 bar). Even operating at these high pressures only allows for about 20% of the hydrogen and nitrogen fed to a typical industrial Haber-Bosch process react to form ammonia. And processing at such high pressures often requires a much more significant capital investment when compared to even slightly more modest pressures, because, for example, compressors that are capable of achieving higher pressures are much more expensive than compressors that are capable of achieving lower pressures and because the entire system must be designed to maintain higher pressures, such as with better sealing and stronger vessels and piping. Operating at higher pressures also requires a higher operating cost in the form of more energy required to drive the higher-pressure compressor and to maintain equipment that can maintain the high pressure, including seals and other replaceable parts of the system.

In addition, in a conventional industrial Haber-Bosch processes, the gas mixture exiting the reactor at about 400° C. is cooled to less than 60° C. so that some of the ammonia condenses. The unreacted nitrogen, hydrogen, and uncondensed ammonia are then mixed with fresh nitrogen and hydrogen, heated back to 400° C., and fed back into the reactor. The cost and complexity of the conventional Haber-Bosch process has stimulated extensive research to find better catalysts, but this research has failed to result in any major increase in conversion or reductions in pressure.

The system 10 of the present disclosure allows the reactor 12 to perform what is essentially the well-known, and well-understood Haber-Bosch process, but allows the reaction to be performed at a lower temperature than a conventional Haber-Bosch process, at a lower pressure than the conventional Haber-Bosch process, or both. For example with a residence time of the $N_2$ feed 4 and/or the $H_2$ feed 6 of from about 1 second to about 20 seconds, and at a temperature of from about 350° C. to about 450° C., for example about 400° C. In an example, the catalyst bed 14 can take up from about 10% to about 90% of the volume of the reactor 12, such as from about 12.5% to about 50% of the volume of the reactor 12.

As described below, the system 10 can be operated much more efficiently and at a much higher overall conversion than in a conventional industrial Haber-Bosch process. In particular, by using an absorbent material to selectively absorb ammonia, as described in more detail below, the reactor 12 can be operated at substantially lower pressures than that which is typical in a conventional industrial Haber-Bosch process. For example, the reactor 12 can be operated at a pressure of from about 10 bar (about 9 atm) to about 100 bar (about 99 atm), for example about 50 bar (about 49 atm), compared to pressures of at least about 130 bar (about 132 atm), as described above for a conventional Haber-Bosch process. In fact, in some examples, the reactor 12 of the system 10 has been operated at pressures as low as about 10 bar (about 9.9 atm) to about 20 bar (about 19.8 atm) and still results in acceptable conversion and yield. In some examples, the pressure at which the reactor 12 is operated is as low as about 20 atm, for example as low as about 10 atm, as low as 9 atm. or as low as about 8 atm. In some examples, the reactor 12 can be operated at a pressure of from about 8 atm to about 150 atm, such as from about 10 atm to about 100 atm. for example from about 25 atm and about 50 atm.

Even though the reactor 12 can be operated at the substantially lower pressures described above, the overall conversion of the system 10 from the $N_2$ and $H_2$ reactant gases to the $NH_3$ product 2 is still very high, and in some examples is much higher than typical conversion values from a conventional industrial Haber-Bosch process, which are typically as low as 10-15%, and at best are typically always 20% or less. In an example, the system 10, with the reactor 12 operated at the temperature and relatively low pressures described above, can achieve a conversion of at least about 10%, for example in the range of from about 10% to about 25%, such as a conversion of at least about 50%, for example in the range of from about 50% to about 65%, such as at least about 70%, for example in the range of from about 70% to about 90%. In some examples, a laboratory-scale version of the system 10 was able to achieve conversions as high as 90% or more. In some examples, an overall conversion to $NH_3$ achieved by the system 10 is from about 10% to about 90%, such as from about 40% to about 60%, for example from about 60% to about 90%. In some examples, the system 10 achieves an overall conversion to $NH_3$ of at least about 40%, for example at least about 45%, at least about 50%, at least about 51%, at least about 52%, at least about 53%, at least about 54%, at least about 55%, at least about 56%, at least about 57%, at least about 58%, at least about 59%, at least about 60%, at least about 61%, at least about 62%, at least about 63%, at least about 64%, at least about 65%, at least about 66%, at least about 67%, at least about 68%, at least about 69%, at least about 70%, at least about 71%, at least about 72%, at least about 73%, at least about 74%, at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, or at least about 95%.

Moreover, because the system 10 described herein can provide for more efficient conversion of the reactant $H_2$ and $N_2$ gases to $NH_3$, a much smaller scale reactor 12 can be used, when compared to a conventional industrial Haber-Bosch process, while still achieving an acceptable yield. For example, the reactor 12 can have a volume as low as from about 0.1 L to about 0.5 L, such as about 0.25 L. The ability to operate at much lower pressures and on a smaller scale can be particularly useful to provide a system 10 for on-site, on-demand production of an $NH_3$ product 2. The use of the absorber 16 described herein, there is not a need to reduce the temperature of the reactor exit line 18 to condense a portion of the $NH_3$, as is typically done in a conventional Haber-Bosch process, such that the system 10 does not require an expensive phase-separation process to separate the condensed $NH_3$ from the recycled reactants, further reducing the capital and operating costs of the system 10 compared to a conventional industrial Haber-Bosch process.

The system 10 also includes an absorber 16 connected downstream and in series with the reactor 12. For example, an exit line 18 from the reactor 12 can be fed directly in to the absorber 16. In other words, in some examples, the reactor exit line 18 is an absorber feed line 18. An absorbent 19 is at least partially contained within the absorber 16. The absorbent 19 comprises an absorptive material that has a selective absorption affinity for $NH_3$. As described above, in some examples, "selective absorption," "selective absorption affinity," and similar terms referring to the selective absorption of $NH_3$, refers to the absorptive material of the absorbent 19 tending to absorb a substantially higher proportion of $NH_3$ as compared to other components in the gaseous mixture in the absorber 16 such that an exit line 20 from the absorber 16 has a lower concentration of $NH_3$ compared to the absorber feed line 18. In particular, the absorbent 19 used in the system 10 has a selective affinity for absorbing ammonia that is higher than the affinity of the absorbent 19 for absorbing $N_2$ gas and $H_2$ gas so that the exit line 20 has a lower concentration of $NH_3$ and higher concentrations of $H_2$ and $N_2$ compared to that in the absorber feed line 18. In this way, the absorber 16 serves a similar purpose to the $NH_3$ condenser in a conventional industrial Haber-Bosch process, i.e., to remove some $NH_3$ product before recycling the mixture back to the reactor 12 (described in more detail below).

In some examples, the concentration of $NH_3$ in the absorber exit line 20 is substantially lower than the $NH_3$ concentration in the absorber feed line 18 when the system 10 is operating in an absorption phase (described in more detail below). In an example, when the system 10 is operating in an absorption phase, and before the absorbent 19 has approached saturation so that $NH_3$ breakthrough has not occurred, the absorbent 19 absorbs at least about 80% of the $NH_3$ from the absorber feed line 18, such as at least about 85%, at least about 86%, at least about 87%, at least about 88%, at least about 89%, at least about 89%, at least about 90%, at least about 91%, at least about 92%, at least about 93%, at least about 94%, or at least about 95% of the $NH_3$ from the absorber feed line 18. In an example, when the system 10 is operating in an absorption phase, and before the absorbent has approached saturation so that that $NH_3$ breakthrough has not occurred, the absorbent 19 absorbs up to at least about 90% of the $NH_3$ from the absorber feed line 18, such as up to at least about 91%, up to at least about 92%, up to at least about 93%, up to at least about 94%, up to at least about 95%, up to at least about 96%, up to at least about 97%, up to at least about 98%, up to at least about 99%, up to at least about 99.1%, up to at least about 99.2%, up to at least about 99.3%, up to at least about 99.4%, up to at least about 99.5%, up to at least about 99.6%, up to at least about 99.7%, up to at least about 99.8%, or up to at least about 99.9% of the $NH_3$ from the absorber feed line 18. In some examples, the absorbent 19 absorbs from about 80% to about 99.9% of the $NH_3$ from the absorber feed line 18, such as from about 85% to about 99% of the $NH_3$, for example from about 95% to at least about 98% of the $NH_3$ from the absorber feed line 18.

In some examples, the absorbent material that is used as the absorbent 19 is a metal salt absorbent material that has an absorption affinity for $NH_3$ over $N_2$ or $H_2$. In an example, the metal salt absorbent material of the absorbent 19 comprises a compound having the general formula [1]:

$M_aX_b$ [1]

where M is a metal cation, X is an anion atom or group, a is a positive integer, for example from 1 to 3, and b is a positive integer, for example from 1 to 8. Examples of metal cations M that have been found to be particularly useful in forming the $NH_3$ absorbent 19 when used as part of the metal salt compound of general formula [1] include, but are not limited to, an alkaline earth metal or a transition metal.

Examples of anion atoms or groups that have been found to be particularly useful in forming the absorbent 19 when used as part of the metal salt compound of general formula [1] include, but are not limited to, halide ions (i.e., $Cl^-$, $B^-$, $I^-$, or $F^-$), or nitrate groups ($NO_3^-$).

In some examples, the absorbent 19 comprises two or more metal salt absorbent materials each having the general formula $M_aX_b$, i.e., with each of the one or more metal salt absorbent materials comprising the same metal cation M or different metal cations $M^1$, $M^2$, etc., and with each of the one or more metal salt absorbent materials comprising the same anion atom or group X or different anion atoms or groups $X^1$, $X^2$, etc. Therefore, in one example, the absorbent 19 includes a mixture of two or more different metal salt absorbent materials, wherein each of the metal salt absorbent materials include the same metal cation, but with two more anion atoms or groups, e.g., a mixture of three different metal salt absorbent materials wherein all three are formed with the same metal cation $M^1$, but with three different anion atoms or groups $X^1$, $X^2$, and $X^3$ (e.g., the absorbent 19 comprises a mixture of $M^1_aX^1_b$, $M^1_aX^2_b$, and $M^{1a}X^3_b$). In another example, the absorbent 19 can be made from a mixture of two or more metal salt absorbent materials comprising two or more different metal cations M wherein a particular metal salt absorbent can include the same anion atom or group X as one or more of the other metal salt absorbent materials in the mixture. e.g., a mixture of three different metal salt absorbent materials made from three different metal cations $M^1$, $M^2$, and $M^3$, but with the same anion atom or group $X^1$ (e.g., the absorbent 19 comprises a mixture of $M^1_aX^1_b$, $M^2_aX^1_b$, and $M^3_aX^1_b$). In yet another example, each metal salt absorbent material of the mixture can include a different metal cation and a different anion group from one or more of the other metal salt absorbent materials. Therefore, in an example, the absorbent 19 comprises a mixture of three different metal salt absorbent materials that each include a unique metal salt cation and a unique anion atom or group (e.g., the absorbent 19 comprises a mixture of $M^1_aX^1_b$, $M^2_aX^2_b$, and $M^3_aX^3_b$). In another example, the absorbent 19 comprises a mixture of three different metal salt absorbent materials formed from two different metal cations and from two or three different anion atoms or groups (e.g., a mixture of $M^1_aX^1_b$, $M^1_aX^2_b$, and $M^2_aX^2_b$, or a mixture of $M^1_aX^1_b$, $M^1_aX^2_b$, and $M^2_aX^3_b$). In another example, the absorbent 19 comprises a mixture of three different metal salt absorbent materials formed from three different metal cations and from two different anion atoms or groups (e.g., a mixture of $M^1_aX^1_b$, $M^2_aX^2_b$, and $M^3_aX^2_b$).

The inventors have found that a metal cation M comprising an alkaline earth metal cation, and in particular magnesium ($Mg^{2+}$), calcium ($Ca^{2+}$), and in some examples, strontium ($Sr^{2+}$), or a Group 12 transition metal cation, and in particular zinc ($Zn^{2+}$), in combination with an anion X that is a halide anion, and in particular chloride ions ($Cl^-$), or nitrate group ions ($NO_3^-$), are useful for small-scale ammonia production in the system 10. The inventors have found that, in certain examples of the system 10, alkaline earth halides, and in particular calcium chloride ($CaCl_2$) and/or magnesium chloride ($MgCl_2$), zinc halides, and in particular zinc chloride ($ZnCl_2$), or zinc nitrate ($Zn(NO_3)_2$) can be particularly ideal for a small-scale system 10, due to a desirable combination of high selective absorption affinity for ammonia, relatively low cost, and relatively high stability under the conditions within the absorber 16. For example, metal chloride salts such as $MgCl_2$ or $CaCl_2$ are relatively inexpensive and readily available and, as described in more detail below, are able to selectively absorb $NH_3$ rather than $H_2$ or $N_2$.

Preferred absorbent materials are those that chemically absorb the $NH_3$ into the absorbent 19, rather than merely adsorb $NH_3$. As a person of skill in the art will appreciate, adsorption of a gas is simply the physical adhesion of the gas to surfaces of the adsorptive material. In contrast, absorption, as with the absorbent 19 used in the system 10 described herein, occurs when the $NH_3$ diffuses into the bulk of the solid absorbent 19 and selectively reacts within the solid. In other words, the $NH_3$ is not only physically adsorbed onto the material, but rather is chemically incorporated into the solid structure of the absorbent 19. This chemical interaction is much stronger, and tends to be much more stable and persistent, even at high temperatures, particularly when compared to surface adsorption, which is rarely strong enough to be maintained at high temperatures.

In some examples the absorbent 19 comprises magnesium chloride ($MgCl_2$) salt as an absorbent material to selectively absorb $NH_3$. In some examples, an $MgCl_2$ absorbent material can absorb ammonia from the absorber feed line 18 according to Reactions [2], [3], and [4].

$$MgCl_2 + NH_3 \rightleftharpoons Mg(NH_3)Cl_2 \quad [2]$$

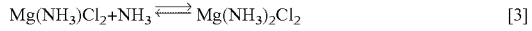
$$Mg(NH_3)Cl_2 + NH_3 \rightleftharpoons Mg(NH_3)_2Cl_2 \quad [3]$$

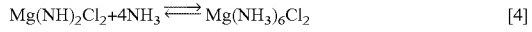
$$Mg(NH_3)_2Cl_2 + 4NH_3 \rightleftharpoons Mg(NH_3)_6Cl_2 \quad [4]$$

The uptake of ammonia into $MgCl_2$ is selective, e.g., $H_2$ gas and $N_2$ gas are not absorbed by the absorbent 19 in any significant amount, and in the system 10. $MgCl_2$ acts to substantially only absorb $NH_3$ such that a substantially smaller amount of unreacted $N_2$ and $H_2$ are absorbed by the absorbent 19, and in some examples none or essentially none of the $N_2$ or $H_2$ present in the absorber feed line 18 are absorbed by the absorbent 19. It has been found that, in some examples, uptake of ammonia into $MgCl_2$ is rapid, such that a relatively short residence time is sufficient for substantial absorption of the $NH_3$ into the metal chloride salt absorbent material. In addition, $MgCl_2$ forms stable gas-solid complexes with the $NH_3$. And $MgCl_2$ is also robust, stable, and inexpensive. The absorption of $NH_3$ into $MgCl_2$ is described in some detail in Huberty et al., AIChE Journal. Vol. 58. No. 11, pp. 3526-32 (November 2012), the disclosure of which is incorporated herein by reference as if reproduced in its entirety.

The inventors have found that, in some examples and under some conditions of the system 10, the use of calcium chloride salt ($CaCl_2$) can have advantages over using only $MgCl_2$ to form the absorbent 19 to selectively absorb $NH_3$. As described in more detail below, when used as the absorbent 19, $CaCl_2$ has been found to be more stable at higher temperatures such that the absorber feed line 18 need not be cooled to as low of a temperature before being fed into the absorber 16. $CaCl_2$ was also found to be more robust and less likely to be friable than $MgCl_2$.

In an example, the absorbent 19 comprises beads or particles of $CaCl_2$ that are particularly suitable for absorption of $NH_3$. In an example, the beads or particles of $CaCl_2$ form a porous microstructure that is favorable for absorption of $NH_3$ into the beads or particles and for desorption of $NH_3$ out of the beads or particles. In an example, the microstructure of the $CaCl_2$ beads or particles that make up the absorbent 19 has a relatively open porosity that allows for homogeneous or substantially homogeneous absorption of $NH_3$ into the beads or particles of the absorbent 19 and/or homogeneous or substantially homogenous desorption of the $NH_3$ out of the beads or particles of the absorbent 19.

In an example, the beads or particles of the absorbent 19 have a microstructure that changes after one or more absorption and desorption cycles, for example with the formation of nanopores or other porous structures during the absorption and desorption cycles leading to an increase in surface area of the absorbent 19. The inventors have found that $CaCl_2$ is particularly advantageous in this respect, as $CaCl_2$ particles, granules, or beads have been found to have an increase in Brunauer-Emmett-Teller surface area ("BET surface area"). As will be understood by a person of ordinary skill in the art, the BET surface area is a method of analyzing and quantifying the surface area available for sorption (including adsorption and absorption). One method of calculating the BET surface area is described in Standard Number 9277 of the International Organization for Standardization ("ISO"), also simply referred to as ISO 9277. In some examples, the inventors have found that $CaCl_2$ absorbent can achieve an increase in BET surface area by as much as a factor of about 5-10 times during successive absorption and desorption cycles in the operation of the system 10. For example, in one experiment $CaCl_2$ absorbent particles were found to have a BET surface area of about 2.4 square centimeters per gram ($cm^2/g$) before being used in any absorption cycles. After 18 absorption cycles, the same $CaCl_2$ absorbent particles were found to have a BET surface area of about 11 $cm^2/g$, an increase of a factor of about 4.6. In this way, $CaCl_2$ has been found to actually improve in absorption efficiency and absorption capacity after each absorption and desorption cycle.

Figure 14A:
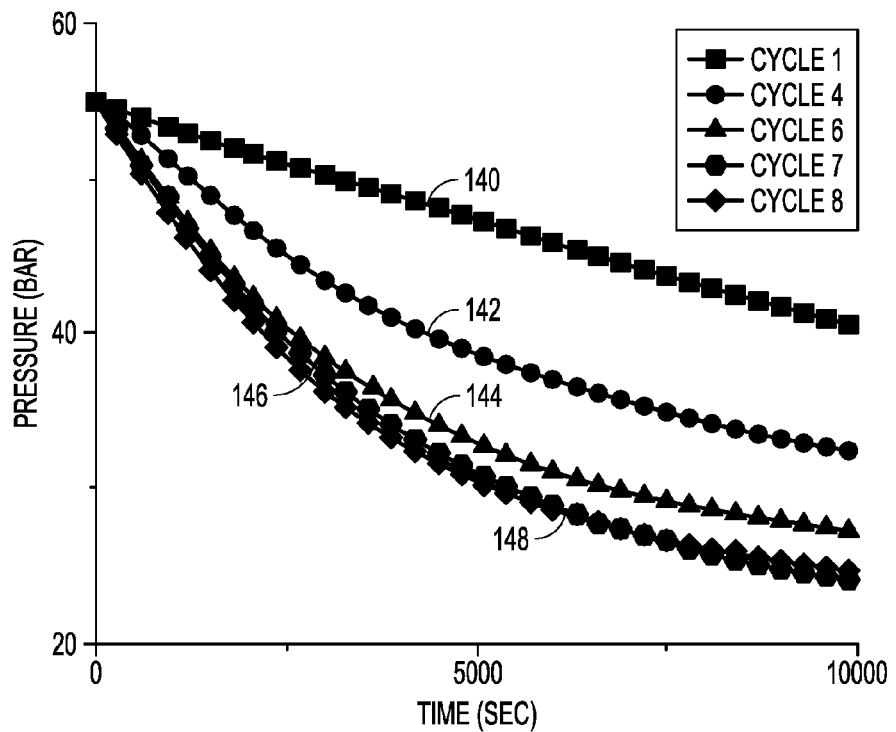
FIG. 14A is a graph showing the conversion over time in an example experimental system using the same experimental reactor used to provide the data in FIGS. 12A, 12B, and 13 along with an example experimental absorber with a calcium chloride absorbent to absorb ammonia produced in the experimental reactor. The graph shows the conversion over time during multiple absorption and desorption cycles by the same calcium chloride absorbent in the absorber.

FIG. 14A (discussed in more detail below) shows an example of this effect. FIG. 14A shows an example of the change in pressure through an absorber (such as the absorber 16 in the system 10 of FIG. 1) during the absorption phase using a $CaCl_2$ absorbent for each of several successive cycles. In FIG. 14A, data series 140 shows the change in pressure across the $CaCl_2$ absorbent during the first absorption phase, data series 142 shows the change in pressure across the same $CaCl_2$ absorbent during the fourth cycle (e.g., after the completion of three full absorption and desorption cycles), and data series 144, 146, and 148 show the change in pressure across the same $CaCl_2$ absorbent during the sixth, seventh, and eighth cycles, respectively. As can be seen in FIG. 14A, the total pressure drop across the $CaCl_2$ absorbent gets larger as more absorption and desorption cycles occur, indicating that the $CaCl_2$ absorbent is absorbing a larger amount of $NH_3$ across the entire absorption phase. FIG. 14A also shows that the initial slope of the pressure drop curve gets steeper as more absorption and desorption cycles occur, indicating an increase in microstructure and overall BET surface area within the $CaCl_2$ absorbent.

The inventors have also found that $CaCl_2$ particles also achieve this advantageous result without substantial breakdown of the particles to a dust-like state and also without forming a bulky, cement-like form. In contrast, under some situations, the inventors have found that $MgCl_2$, while being initially promising, can form either a dust or cement-like bulk, both of which being unable to achieve good flow of the gases through the absorber 16.

In an example, the absorbent 19 can comprise a granular or particulate form of $CaCl_2$ that is available even "off the shelf" (that is, without requiring any specially processing before it is used as the absorbent 19), that provides for even or substantially even flow distribution of the gases from the absorber feed line 18. In an example, a microstructure for the beads or particles of the absorbent 19 can be achieved with a recrystallized $CaCl_2$ material that is used to form the beads or particles.

It may also be possible for $NH_3$ absorbing materials other than $CaCl_2$ to have or to be manufactured to possess structures or properties similar to what is described above for $CaCl_2$, and thus also be usable as the absorbent 19 with many of the same advantages described herein with respect to a $CaCl_2$ absorbent 19. For example, it is possible that $MgCl_2$, $ZnCl_2$, or $Zn(NO_3)_2$ can be manufactured into a form that has a similar porous microstructure to the $CaCl_2$ beads or particles described above, or that achieve the same formation of nanopores and improved absorption during repeated absorption and desorption cycles as described above. Also, in some examples, the absorbent 19 can be a composite material. For example, the beads or particles of the absorbent 19 can comprise one or more of the metal salt absorbent materials described above supported on a porous support structure, such as porous silica beads or other porous support structures. A composite structure may allow the absorbent 19 to achieve some of the desirable properties described above for $CaCl_2$, such as its open porosity that provides for homogeneous or substantially homogeneous $NH_3$ absorption and desorption and its desirable heat of absorption and thermal expansion properties during absorption and desorption cycles. For these reasons, the description herein of $CaCl_2$ being preferred or particularly suited for the operation of the system 10 is not intended to be limiting, particularly if an when advances for similar absorbent materials are made.

The inventors have also found that the absorbent 19 tends to expand and contract during absorption and desorption of the $NH_3$ into and out of the absorbent 19, for example due to changes in temperature of the absorbent 19 due to the heat of absorption (often also referred to as the absorption enthalpy) of the absorbent material. The heat of absorption for $NH_3$ into $MgCl_2$ is about 90 kilojoules per mole (kJ/mol), while the heat of absorption for $NH_3$ into $CaCl_2$ is lower, about 60 kJ/mol. Therefore, $CaCl_2$ will tend to have smaller temperature changes resulting in less expansion and contraction of the absorbent 19 during absorption and desorption, such that $CaCl_2$ beads or particles will tend to be more stable in the long term as compared to $MgCl_2$. The inventors have also found that $MgCl_2$, which is typically available as a powder, tends to more readily result in non-homogeneous tunneling or channeling over time, potentially resulting in non-homogenous or inefficient absorption and desorption of $NH_3$ into and out of an $MgCl_2$ absorbent. In contrast, the inventors have found that $CaCl_2$ tends to be less likely to result in channeling, tunneling, or pore blocking than $MgCl_2$ such that $CaCl_2$ seems to be more likely to maintain homogenous or substantially homogenous absorption and desorption of $NH_3$ during operation of the absorber 16.

Examples of commercially-available $CaCl_2$ beads or particles that have been found to have a microstructure conducive to absorption and desorption of $NH_3$ are $CaCl_2$ beads or particles sold by the Occidental Chemical Company ("OyxChem") of Ludington, Mich. USA, such as anhydrous $CaCl_2$ mini-pellets or $CaCl_2$ products sold under the trade name PELADOW (e.g., PELADOW pellets or briquettes) (formerly sold under the same trade names by Dow Chemical Co., Midland, Mich., USA), or solid $CaCl_2$ (such as granular $CaCl_2$, $CaCl_2$ beads, or $CaCl_2$ powder) sold by Sigma-Aldrich Co., St. Louis, Mo., USA under CAS Number 10043-42-4.

Similar to the reaction of $MgCl_2$ with $NH_3$, a $CaCl_2$ absorbent material can absorb ammonia from the absorber feed line 18 according to Reactions [5], [6], and [7]. Reactions [2], [3], and [4].

$$CaCl_2 + NH_3 \rightleftharpoons Ca(NH_3)Cl_2 \qquad [5]$$

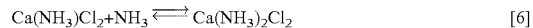
$$Ca(NH_3)Cl_2 + NH_3 \rightleftharpoons Ca(NH_3)_2Cl_2 \qquad [6]$$

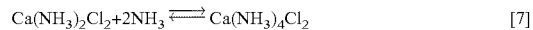
$$Ca(NH_3)_2Cl_2 + 2NH_3 \rightleftharpoons Ca(NH_3)_4Cl_2 \qquad [7]$$

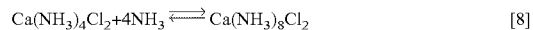
$$Ca(NH_3)_4Cl_2 + 4NH_3 \rightleftharpoons Ca(NH_3)_8Cl_2 \qquad [8]$$

Reactions [2], [3], and [4] (for $MgCl_2$) and Reactions [5], [6], [7], and [8] (for $CaCl_2$) are temperature dependent. For example, at an ammonia partial pressure of about 1 bar and when in equilibrium, Reaction [2] generally occurs at temperatures above 375° C., Reaction [3] generally occurs at temperatures from about 275° C. to about 325° C., and Reaction [4] generally occurs at temperature below about 175° C. Absorption by $CaCl_2$ is dependent on temperature in a similar manner, e.g., at an ammonia partial pressure of about 1 bar and when in equilibrium, Reaction [5] generally occurs at temperatures above about 250° C., Reaction [6] occurs at temperatures around about 200° C., for example from about 175° C. to about 225° C., Reaction [7] occurs at temperatures around about 75° C., such as from about 60° C. to about 90° C., and Reaction [8] occurs around about 100° C. or lower, such as from about 20° C. to about 80° C., for example at about 50° C. or lower. Thus, a first temperature (e.g., a low temperature) can be applied to the gas and the absorbent to allow $NH_3$ to absorb into the absorbent, and a second temperature (e.g., a high temperature) can be applied to the gas and the absorbent to allow the $NH_3$ to desorb from the absorbent.

Reactions [2], [3], and [4] (for $MgCl_2$) and Reactions [5], [6], [7], and [8] (for $CaCl_2$) can also be pressure dependent, e.g., with Reactions [2] or [5] dominating at lower pressures, e.g., around atmospheric pressure, with Reactions [3], [6], or [7] beginning to dominate at higher pressures, and with Reactions [4] or [8] becoming the dominant mechanism at even higher pressures. Therefore, while a first pressure (e.g., a higher pressure) can be applied to the gas and the absorbent can be applied to the gas and the absorbent to allow $NH_3$ to absorb into the absorbent, and a second pressure (e.g., a lower pressure) can be applied to the gas and the absorbent to allow the $NH_3$ to desorb from the absorbent.

As will be appreciated by a person of ordinary skill in the art, in some examples, it may be preferable to keep the pressure that is experienced by the absorbent 19 at a relatively constant pressure, and to control absorption and desorption by controlling the temperature so that the higher reactions (i.e., Reaction [4] for $MgCl_2$ or Reactions [7] and [8] for $CaCl_2$) dominate when absorption is desired (e.g., controlling to a lower temperature), and by controlling the temperature so that the lower reactions (i.e., Reaction [2] for $MgCl_2$ or Reaction [5] for $CaCl_2$) dominate when desorption is desired (e.g., controlling to a higher temperature).

In other examples, both pressure and temperature can be used to affect absorption and desorption of $NH_3$. For example, the absorber 16 can be subjected to a first set of conditions selected to provide for absorption of $NH_3$, e.g. a first relatively low temperature and/or a first relatively high pressure, until a predetermined desired amount of $NH_3$ has been absorbed. Then, the absorber 16 can be subjected to a second set of conditions selected to provide for desorption of the $NH_3$ from the absorbent, e.g., a second relatively high temperature and/or a second relatively low pressure.

In an example, the system 10 includes a reactor control system to control one or both of the reaction temperature or the reaction pressure that is experienced by reaction mixture and the catalyst bed 14 in the reactor 12 in order to control the reaction of the $N_2$ feed 4 and the $H_2$ feed 6 to produce ammonia, such as one or both of a reactor temperature control system 22 or a reactor pressure control system 24. As will be understood by a person of ordinary skill in the art, the temperature control system 22 can include a temperature sensor (not shown) for measuring a temperature of the reactor 12, such as by measuring a temperature at the catalyst bed 14, at some other point in the reactor 12, or an exit temperature of the reactor exit line 18, and a temperature controller that can control a heater 26 or a cooler (not shown), or both, in order to modify the temperature within the reactor 12. As will also be understood by a person of ordinary skill in the art, the pressure control system 24 can include a pressure sensor (not shown) for measuring a pressure within the reactor 12, and a pressure controller that can control a compressor 28 (e.g., to increase the pressure) or a pressure release (not shown) (e.g., to decrease the pressure), or both, in order to modify the pressure within the reactor 12. Because the reactor control system (e.g., that includes the temperature control system 22 or the pressure control system 24, or both) controls parameters of the reactants that are fed into the reactor (e.g., from the $N_2$ feed 4 and the $H_2$ feed 6), the reactor control system may also be referred to herein as a "feed control system."

In an example, one or both of the heater 26 and the compressor 28 act on the combined feed gasses 4, 6, as is shown in FIG. 1. However, in an example, the temperature control system 22 can include a separate dedicated heater for each of the $N_2$ feed 4 and the $H_2$ feed 6 (not shown). Similarly, the pressure control system 24 can include a separator dedicated compressor for each of the $N_2$ feed 4 and the $H_2$ feed 6 (not shown).

In an example, the system 10 includes one or both of an absorber temperature control system 30 or an absorber pressure control system 32 for controlling one or both of the temperature or the pressure that is experienced by the absorbent 19 and the gasses from the absorber feed line 18 while in the absorber 16 in order to control absorption or desorption of $NH_3$ from the absorbent 19 during operation of the system 10. As will be understood by a person of ordinary skill in the art, the absorber temperature control system 30, like the reactor temperature control system 22, can include a temperature sensor (not shown) for measuring a temperature of the absorber 16, such as by measuring a temperature at the absorbent 19 or an exit temperature of the absorber exit line 20, and a temperature controller that can control a heater 34 or a cooler (not shown), or both, in order to modify the temperature within the absorber 16. In an example, the temperature control system 30 is configured to control the temperature at the absorbent 19 between a first temperature selected for $NH_3$ absorption by the absorbent 19 during the absorption phase and a second temperature selected for $NH_3$ desorption from the absorbent 19 during the desorption phase.

In an example, the first temperature selected for the absorption phase, i.e., the temperature that the temperature control system 30 targets for the absorber 16 during the absorption phase, is 100° C. or lower. In an example, the first temperature selected for the absorption phase is about 80° C. or lower. In an example, the first temperature selected for the absorption phase is about 75° C. or lower. In an example, the first temperature selected for the absorption phase is about 50° C. or lower. In an example, the first temperature for the absorption phase is selected in the range of from about 20° C. to about 80° C., for example from about 20° C. to about 50° C.

In an example, the second temperature selected for the desorption phase, i.e., the temperature that the temperature control system 30 targets for the absorbent 19 during the desorption phase, is 150° C. or greater. In an example, the second temperature selected for the desorption phase is about 175° C. or greater. In an example, the second temperature selected for the desorption phase is about 200° C. or greater. In an example, the second temperature selected for the desorption phase is about 225° C. or greater. In an example, the second temperature selected for the desorption phase is about 250° C. or greater. In an example, the second temperature for the desorption phase is selected to be in a range from a minimum range temperature to a maximum range temperature. In various examples, the minimum range temperature is selected to be about 150° C., about 175° C. about 200° C., about 225° C., or about 250° C. and the maximum range temperature is selected to be about 250° C., about 275° C., about 300° C. about 325° C., about 350° C., about 375° C., or about 400° C. The selected range for the second temperature of the desorption phase can be recited as being "selected to be in the range from [any particular minimum range temperature] to [any particular maximum range temperature]." Thus, non-limiting examples of how the ranges can be recited include "the second temperature of the desorption phase is selected to be in the range of from about 150° C. to about 275° C." or "the second temperature of the desorption phase is selected to be in the range of from about 200° C. to about 350° C."

In some examples, the first temperature may be the only variable controlled by the system 10 to provide for or induce $NH_3$ absorption and the second temperature may be the only variable controlled by the absorber control system 30 to provide for or induce $NH_3$ desorption. Alternatively, in some examples, in addition to controlling the temperature of the absorbent 19 to the first and second temperatures, the absorber control system 30 can control the temperature of the absorbent 19 in conjunction with one or both of a first pressure selected for $NH_3$ absorption during the absorption phase and a second pressure selected for $NH_3$ desorption during the desorption phase. However, as described above, in some examples it is preferable to keep the pressure that is experienced by the absorbent 19 at a relatively constant pressure, and to control absorption and desorption by controlling to the lower first temperature when absorption is desired and to the higher second temperature when desorption is desired.

As will also be understood by a person of ordinary skill in the art, the absorber pressure control system 32, like the reactor pressure control system 24, can include a pressure sensor (not shown) for measuring a pressure within the absorber 16, and a pressure controller that can control one or both of a compressor 36 or a pressure release, such as a pressure release valve 38 or a vacuum pump 40, or both, in order to modify the pressure within the absorber 16, such as by controlling the pressure of the gas entering the absorber 16 by compressing or decompressing the gasses in the absorber feed line 18 before feeding it to the absorber 16.

In an example, the absorber 16 can have a residence time of from about 1 second to about 20 seconds. As used herein, the "residence time" of the absorber 16 can refer to the volume of the absorber 16 divided by the volumetric flow rate of the gas through the absorber 16, wherein the volumetric flow rate can be measured as the volumetric flow rate of the absorber feed line 18, or the combination of the volumetric flow rate of the absorber exit line 20 out of the absorber and the volumetric rate of absorption of $NH_3$ into the absorbent 19.

In a small-scale example, the absorber 16 can have a volume of 0.1 L to about 0.5 L, such as about 0.25 L. The absorber 16 can be operated at a pressure of from about 10 bar (about 49 atm) to about 100 bar (about 98 atm), for example about 50 bar (about 79 atm). The absorber 16 has been shown to provide for similar absorbing performance in a first, lower temperature range of from about 170° C. to about 270° C. and in a second, higher temperature range of from about 300° C. to about 400° C. In an example, the absorber 16 is operated at a temperature of about 200° C. and at a pressure of about 10, 25, 30, 50, and 80 bar.

In the example system 10 shown in FIG. 1, the absorber 16 is shown as being separate from and downstream of the reactor 12. In another example, not shown, the reactor can include an absorber component incorporated within the main housing of the reactor so that the absorber and the reactor are integrated together. An integrated reactor can include a catalyst bed module comprising the catalyst and an absorber module comprising the absorbent, e.g., the $MgCl_2$, for the absorption of produced $NH_3$.

It is believed that the operating temperatures and pressures of the reactor 12 and the absorber 16 described above can be reduced due to optimization to provide for reduced energy requirements while still providing comparable conversion performance of the system. At least a portion of the absorber exit line 20 from the absorber 16 can be recycled back into the reactor 12 via a recycle line 42, for example using a recirculation pump 44.

The removal of $NH_3$ from the absorber feed line 18 via absorption into the absorbent 19, e.g., a metal chloride salt absorbent, increases the mole fraction of $N_2$ gas and $H_2$ gas in the recycle line 42, which in turn can increase the overall mole fraction of $N_2$ gas and $H_2$ gas in the reactor 12. In some examples, such an increase of $H_2$ and $N_2$ as a result of recycling the $N_2$ and $H_2$ from the absorber exit line 20 to the reactor 12 drives the forward reaction toward $NH_3$ over the reverse reaction from $NH_3$ toward $N_2$ gas and $H_2$ gas. In an example, the recycle flow rate can be from about 10% and about 500% of the combined flow rate of the $N_2$ feed 2 and the $H_2$ feed 4, such as about 50% or 100%. In a small-scale example, the flow rate of recycled gas in the recycle line 42 can be from about 0.25 standard liters per minute (SLPM) to about 10 SLPM.

In an example, the system 10 is operated by a cyclical method comprising one or more cycles alternating between an absorption phase and a desorption phase. In an example, during the absorption phase, $N_2$ and $H_2$ are fed to the reactor 12, e.g., via the feed lines 4, 6, where they react to form $NH_3$, for example via a reaction catalyzed by the catalyst in the catalyst bed 14, to form $NH_3$. The pressure of the $N_2$ feed 4 and the $H_2$ feed 6 can be controlled to be at a specified reaction pressure by the reactor pressure control system 24 and the compressor 28, e.g., to compress the gas feeds 4, 6 to a reaction pressure of from about 10 atm to about 100 atm. The temperature of the reactor 12 and/or the gas feeds 4, 6 are controlled by the reactor temperature control system 22 and the heater 26 so that the reactant gases are at a specified reaction temperature, e.g., to heat the gas feeds 4, 6 or the reaction mixture within the reactor 12 to a reaction temperature from about 330° C. to about 500° C.

Continuing with the absorption phase, $NH_3$ produced in the reactor 12, along with unreacted $N_2$ and $H_2$, flow from the reactor 12 to the absorber 16. e.g., through the reactor exit/absorber feed line 18, where at least a portion of the $NH_3$ is absorbed by the absorbent 19, which, as described above, can be a metal chloride salt absorbent, for example one or both of $CaCl_2$ or $MgCl_2$. The absorption phase can also include controlling the temperature at the absorbent 19 to be at a specified absorption temperature, e.g., with the absorber temperature control system 30 and the heater 34, for example to an absorption temperature of from about 100° C. to about 400° C. The absorption phase can include, in addition to or in place of controlling the temperature at the absorbent 19, controlling the pressure in the absorber 16 to be at a specified absorption pressure, e.g., with the absorber pressure control system 32, the compressor 36, and the pressure release valve 38, for example to an absorption pressure of from about 1 atm to about 100 atm. The gasses exiting the absorber 16, e.g., via the absorber exit line 20, include unreacted $N_2$ and $H_2$ and, in some examples, unabsorbed $NH_3$. In some examples, the absorption phase includes recycling at least a portion of the gasses from the absorber exit line 20 back to the reactor 12, which includes unreacted $N_2$ gas, unreacted $H_2$ gas, and, if present, any unabsorbed $NH_3$, such as via the recycle line 42 and driven by the recirculation pump 44.

In an example, the absorption phase is allowed to continue, i.e., with the gasses being allowed to substantially continuously flow and cycle through the reactor 12, the absorber 16, and the recycle line 42, for a specified period of time or until the absorbent 19 reaches a specified saturation with respect to absorbed $NH_3$, for example when the absorbent 19 has become substantially saturated with $NH_3$ at its current temperature and pressure. In an example, the absorption phase can be considered to be completed and the system 10 can be considered ready to change over to the desorption phase when the amount of $NH_3$ absorbed by the absorbent 19 has reached a predetermined specified percentage of the theoretical $NH_3$ absorption capacity of the absorbent 19. The theoretical $NH_3$ absorption capacity of the absorbent 19 can be readily determined by a person of ordinary skill in the art. For example, when the absorbent 19 comprises $MgCl_2$ or $CaCl_2$, or both, the theoretical $NH_3$ absorption capacity has been well studied and can be determined based on the mass of the $MgCl_2$ and $CaCl_2$ in the absorber 16, the temperature and pressure of the absorbent 19, and the expected amount of $NH_3$ absorbed based on Reactions [2]-[4] (for $MgCl_2$) and/or Reactions [5]-[8] (for $CaCl_2$) by that mass of absorbent 19 at that temperature and pressure.

Whether the absorbed $NH_3$ has reached the specified percentage of the theoretical absorption capacity can be determined, for example, by the noting when the pressure within the absorber 16 or the absorber exit line 20 rises to a specified pressure that is associated with the absorbent 19 having reached the specified percentage of the theoretical absorption capacity. The increase in pressure when the absorbed $NH_3$ has reached the specified percentage is due to a higher proportion of $NH_3$ from the absorber feed line 18 passing through the absorbent 19 without being absorbed, also referred to as "breakthrough." In an example, the predetermined specified percentage of the theoretical $NH_3$ absorption capacity that will be considered as an $NH_3$ breakthrough that triggers the switch over to the desorption phase, can be 100% of the theoretical absorption capacity, or some smaller percentage, such as from about 50% to about 99% of the theoretical $NH_3$ absorption capacity, for example from about 70% to about 95%, such as about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 99.5%, or about 99.9%.

When it is determined that the absorption phase should be completed, for example when the predetermined specified percentage of the theoretical $NH_3$ absorption capacity is reached, feed of one or both of the reactant $N_2$ gas and the reactant $H_2$ gas can be shut off through one or both of the gas feeds 4, 6. In addition, recycling of unreacted $N_2$ gas and $H_2$ gas through the recycle line 42 also can be ceased, e.g., by shutting off the recirculation pump 44. The shutdown of one or both of the reactant gases through the gas feeds 4, 6 and the recycle line 42 stops the reactants from being fed to the reactor 12 so that the reaction to form $NH_3$ within the reactor 12 is at least temporarily ceased. The desorption phase further includes subjecting the absorbent 19 to one or more desorption conditions that causes at least a portion of $NH_3$ absorbed in the absorbent 19 to desorb and be released from the absorbent 19. At least a portion of the desorbed and released $NH_3$ is collected as the $NH_3$ product 2, for example via a product line 46.

Alternatively, the process 10 of FIG. 1 can be modified to include two or more absorbers 16 that are operated in parallel. In such an example, during operation a first set of one of the absorbers 16 can be operated in the absorption phase, while a second set of one or more of the absorbers 16 are operated in the desorption phase. When it is determined that the absorption phase is completed or is nearing completion (for example, when a predetermined specified threshold of the percentage of the theoretical $NH_3$ absorption capacity is reached in the absorber 16), the flow of the reaction mixture being fed to the first set of one or more absorbers 16 can be ceased and the reaction mixture can be directed to the second set of one or more absorbers 16 (e.g., by directing the gas mixture from the compressor 36 from the one or more absorbers of the first set 16 to the one or more absorbers 16 of the second set) so that the second set of one or more absorbers 16 is then operated in the absorption mode. The outlet or outlets 20 from each of the one or more absorbers 16 from the second set can also be directed to the recycling line 42 so that unreacted $N_2$ gas and $H_2$ gas is recycled back to the reactor 12. While the second set of one or more absorbers 16 is operated in the absorption phase, the one or more absorbers 16 of the first set can be operated in the desorption phase so that $NH_3$ in the absorbent of the first set is desorbed and produced as the $NH_3$ product 2. Operation in the desorption phase can include subjecting the absorbents 19 in the set being desorbed from to one or more desorption conditions that causes at least a portion of $NH_3$ absorbed in the absorbent 19 to desorb and be released from the absorbent 19, where it can be collected, for example in the product line 26, to provide the $NH_3$ product 2.

When the absorption phase is complete or nearly complete in the one or more absorbers 16 of the second set, the flow of the reaction mixture can be switched back to the first set of one or more absorbers 16 so that the first set is operated in the absorption phase. After switching the reaction mixture back to the first set, the $NH_3$ in the absorbent of the second set of one or more absorbers can be desorbed by operating the second set in the desorption phase.

In the alternative process with the first and second sets of one or more absorbers 16, operation of the first and second sets to alternate with one of the sets operated in the absorption phase and the other operated in the desorption phase allows the reaction that forms $NH_3$ within the reactor 12 to be continuous or substantially continuous.

In some examples, there are three or more sets of absorbers 16, with each set comprising one or more absorbers 16 that are operated independently from each of the other sets. In such an example, the process can be operated so that at any one point in time, there is always at least one set of one or more absorbers 16 that is operating in the absorption phase to absorb $NH_3$ that is produced by the reaction in the reactor 12 from the reactant stream. The third set (or more sets if needed) can act as a swing absorber set in the event that the desorption phase takes longer than the absorption phase or to allow one or more sets of absorbers 16 to be taken offline for maintenance. When there is one or more extra sets of absorbers 16 (e.g., at least a third set, and in some examples four or more sets, each of one or more absorbers 16), when a set of one or more absorbers 16 that is being operated in the absorption phase completes or nearly completes absorption (e.g., when the absorbed $NH_3$ in the one or more absorbers 16 of that set reach a predetermined specified threshold saturation), the feed of the reaction mixture from the reactor 12 to that set of one or more absorbers is ceased, and the reaction mixture is then directed to the next set of one or more absorbers 16 that is to be operated in the absorption phase. In an example, the set of one or more absorbers 16 that will be next to be operated in the absorption phase is the set of one or more absorbers that has been in the desorption phase the longest.

The system 10 can include one or more flow control devices that direct gas flow from the absorber 16 either to the recycle line 42. e.g., during the absorption phase, or to the product line 46, e.g., during the desorption phase. In an example, the one or more flow control devices include one or more valves 38, 48, 50, 52 that can be opened or closed, either partially or completely, to control the flow of gas into or through a particular line 4, 6, 42, 46, depending on the particular phase of the system 10. It will be understood that the system 10 is not limited to valves, as shown in the figures and described below, but rather any type of flow control device commonly used by those of skill in the art for fluid flow control, and particularly for gas flow control, can be used in addition to or in place of any or all of the valves shown and described for specific examples herein.

In the example shown in FIG. 1, a recycle valve 48 controls the flow of gas into or through the recycle line 42, while a second valve controls the flow of gas into or through the product line 46. In an example, the pressure release valve 38, described above, can act as the valve that controls flow into or through the product line 46. One or more additional valves or other flow control devices can be included to control flow into or through one or more of the lines of the system 10, such as an $N_2$ valve 50 on the $N_2$ feed line 4 to control flow of $N_2$ reactant gas into the reactor 12, an $H_2$ valve 52 on the $H_2$ feed line 6 to control flow of $H_2$ reactant gas into the reactor 12, and a reaction mixture valve 54 to control flow through the reactor exit/absorber feed line 18 in examples where the absorber 16 is separate from the reactor 12.

In an example, during the absorption phase, the valve 38 on the product line 46 is closed and the recycle valve 48 is open so that all or substantially all of the gas exiting the absorber 16 through the absorber exit line 20, which primarily includes unreacted $N_2$ and $H_2$ gas, is recycled through the recycle line 42. During the absorption phase, the $N_2$ valve 50, the $H_2$ valve 52, and the reaction mixture valve 54 can also be open so that the reactant gases are fed to the reactor 12 through the gas feeds 4, 6 and so that the reaction mixture from the reactor 12 will flow to the absorber 16. In an example, during the desorption phase, the recycle valve 48 is closed to prevent the gas exiting the absorber 16, which primarily includes $NH_3$ that has desorbed from the absorbent 19, from flowing through the recycle line 42 back to the reactor 12, and to direct the $NH_3$ product gas to the product line 46. In some examples, during the desorption phase, one or more of the $N_2$ valve 50 and the $H_2$ valve 52 can be closed to prevent one or both of the $N_2$ or $H_2$ reactant gases from being fed to the system 10. The reaction mixture valve 54 can also be closed to prevent flow of gas from the reactor 12 to the absorber 16 and also to prevent backflow of the $NH_3$ product gas from the absorber 16 into the reactor 12. In some examples, the system 10 can include a carrier gas feed system 56 to feed a carrier gas, such as $N_2$ gas, to the absorber 16 during the desorption phase in order to aid in desorption and collection of $NH_3$ from the absorbent 19. The carrier gas from the carrier gas feed system 56 can also be used to regenerate the absorbent 19, for example during routine maintenance of the absorber 16 before switching back to the absorption phase from the desorption phase.

The desorption phase is describe above as the reaction in the reactor 12 being put on hold while $NH_3$ is desorbed from the absorbent 19, the present application is not so limited. Rather, a system could include one or more reactors each similar to the reactor 12 and one or more absorbers connected in parallel, with each absorber being similar or identical to the absorber 16 described above. In such a system, the reactor can be operated in a continuous or near continuous manner with the output from the reactor being directed to a first of the parallel absorbers until the absorbent of the first absorber reaches the specified saturation of $NH_3$, at which point the output from the reactor can be switched to a second of the parallel absorbers. While the reactor output flows to the second parallel absorber, the first parallel absorber can be subjected to a desorption phase, e.g., by applying one or more desorption conditions, such as a desorption pressure or a desorption temperature, or both, in order to desorb $NH_3$ from the absorbent of the first parallel absorber. In this way, the first and second parallel absorbers can alternate, with the first parallel absorber being in the absorption phase while the second parallel absorber is in the desorption phase, and vice versa. Additional parallel absorbers can also be included in such a system in the event that the absorption phase tends to take longer than the desorption phase or vice versa in order to ensure that the operation of the system can be continuous.

In some examples, a substantial portion of the absorbed $NH_3$, such as all of or substantially all of the absorbed $NH_3$, is desorbed and released from the absorbent 19. In an example, the one or more desorption conditions can include a predetermined specified desorption pressure in the absorber 16 that is reduced compared to the absorption pressure applied during the absorption phase, or a predetermined specified desorption temperature that is increased compared to the absorption temperature applied to the absorbent 19 during the absorption phase, or both. For example, as will be appreciated by a person of ordinary skill in the art, with a metal chloride salt absorbent material such as $MgCl_2$ or $CaCl_2$, a reduced desorption pressure or an increased desorption temperature, or both, causes the higher absorption reactions (e.g., Reaction [4] for $MgCl_2$ or Reaction [8] for $CaCl_2$) to become disfavored, and the lower absorption reactions (e.g., Reaction [2] for $MgCl_2$ or Reaction [5] for $CaCl_2$) to become more favored such that at least a portion of the $NH_3$ that had been absorbed by the metal chloride salt absorbent 19 during the absorption phase is desorbed from the absorbent 19.

In an example, the pressure in the absorber 16 can be reduced to the specified desorption pressure via a pressure release mechanism, such as the pressure relief valve 38 that is opened, or by activating a vacuum pump 46, or both. In an example, the specified desorption pressure in the absorber 16 is a predetermined specified pressure set point or range that is controlled by measuring a pressure of the absorber 16 or the absorber exit line 20 and controlling the pressure release valve 38 or the vacuum pump 44, or both, and in some examples the compressor 36, based on the measured pressure. In an example, the temperature in the absorber 16 can be increased to the specified desorption temperature by activating the heater 34 to heat the absorbent 19. In an example, the specified desorption temperature is a predetermined specified temperature set point or range that is controlled by measuring a temperature of one or more of the absorber 16, the absorbent 19, or the exit line 20 and controlling the heater 34 based on the measured temperature. In an example, the specified desorption pressure set point or range that is selected to induce $NH_3$ desorption can depend on the measured temperature of the absorbent 19. Similarly, the specified desorption temperature set point or range that is selected to induce $NH_3$ desorption can depend on the measured pressure in the absorber 16. In this way, different combinations of specified desorption pressure set points and specified desorption temperature set points can be selected and the pressure release valve 38 or the vacuum pump 44, or both, and the heater 34 can be controlled in tandem to induce $N\ H_3$ desorption. In some examples, the specified desorption pressure set point or range and the specified desorption temperature set point or range can be determined and controlled to optimize one or both of the rate at which the $NH_3$ is desorbed from the absorbent 19 and the amount of $NH_3$ that is desorbed from the absorber 16.

As shown below with reference to the Examples, the combined production of $NH_3$ and subsequent absorption of the $NH_3$ can allow the system 10 to surpass typical equilibrium conversion values achievable by the conventional industrial Haber-Bosch process, which typically peak at about 15%. In examples, the system 10 can provide for conversion to ammonia of at least about 50%, such as at least about 55%, for example at least about 60%, such as at least about 65%, for example as at least about 70%, such as at least about 75%, for example at least about 80%, such as at least about 85%, for example at least about 86%, 87%, 88%, 89%, 90%, 91%, 92%, 93%, 94%, or 95%. As noted below in the examples, the system 10 of the present description can provide for conversion as high as 95%, such that the system 10 can provide for a conversion that is 5 times or more than that which has been typically possible in even the most efficient Haber-Bosch plants.

Such a high conversion can allow the system 10 to be on a much smaller scale than Haber-Bosch plants such that the system 10 can be a small-scale system that can be installed on-site where the ammonia is to be used. This can essentially eliminate $NH_3$- transportation costs. Moreover, operation on the small scale of the system 10 can have much lower energy requirements than a Haber-Bosch plant. In addition, because of the high conversion, the $H_2$ feed gas can be provided via methods other than steam reforming of natural gas, further reducing the energy requirements of the system 10. For example, the $H_2$ feed 6 can be provided, for example, via electrolysis of water, which is not practical on very large scales, but which can be economically viable on small scales such as system 10. In an example, the $N_2$ feed 4 is provided by separating nitrogen gas from air using selecting membranes.

The flow rates, volumes, and other values described above with respect to the system 10 are not intended to be limiting and are simply added to provide context. The values can be scaled up or down by a person of skill in the art depending on the desired output of the system 10.

EXAMPLES

Various embodiments of the present invention can be better understood by reference to the following Examples, which are offered by way of illustration. The present invention is not limited to the Examples given herein.

Example 1

Nitrogen gas ($N_2$) and hydrogen gas ($H_2$) are fed into a system that is substantially similar to system 10 described above. For this reason, the same reference numbers used above with respect to the system 10 of FIG. 1 will be used with respect to this Example. The $N_2$ gas and the $H_2$ gas are fed to a 0.25 L reactor 12 that has been pre-heated to about 400° C. The reactor 12 includes a wüstite (FeO) catalyst bed 14. The $N_2$ gas is fed to the reactor 12 at a rate of about 0.5 SLPM and the $H_2$ gas is fed to the reactor 12 at a rate of about 1.5 SLPM. A trace amount (e.g., about 0.1-0.3 SLPM) of argon gas (Ar) is also fed to the reactor 12 for gas chromatograph (GC) analysis, as described below. Reaction product gas (e.g., ammonia ($NH_3$)) and unreacted $N_2$ and $H_2$ gas are allowed to flow into a 0.25 L absorber 16 with a bed of magnesium chloride ($MgCl_2$) absorbent 19 operating at a 200° C. bed temperature until the pressure within the system has reached 80 bar. A recirculation pump 44 is then turned on to recycle the absorber outlet gas, which includes unabsorbed $NH_3$ and unreacted $N_2$ and $H_2$, back to the reactor 12 through a recycle line 42. The flow rate of the recycled gas can be from about 0.25 SLPM to about 10 SLPM. The gasses are allowed to proceed through the system (e.g., from the reactor 12 and the absorber 16, and through the recycle line 42 back to the reactor 12) for a designated amount of time from about 5 minutes to about 400 minutes, such as an average of about 200 minutes. After the designated about of time, the pressure in the system is released, such as via a pressure release gate valve 38, which causes ammonia to desorb from the $MgCl_2$ absorbent 19.

Ammonia conversion in the reactor 12 and ammonia absorption in the absorbent 19 can be monitored using an electric pressure transducer to measure changes in system pressure and a gas chromatograph (GC) to measure gas phase chemical composition. Pressure changes measured by the transducer can be used to calculate anticipated chemical compositions. 1 mL gas samples are obtained from a needle bleed valve downstream of the absorber 16. The gas samples are injected into an Agilent Plot Q column for GC analysis for confirmation on these calculations. The GC column can be held at −60° C. for 3 minutes and then ramped up to 160° C. over eleven minutes, and helium is used as carrier gas. Peaks corresponding to hydrogen, nitrogen, and argon (a trace amount is used as an inert standard) are seen between 1 and 3 minutes while ammonia is seen after 10 minutes.

Figure 2:
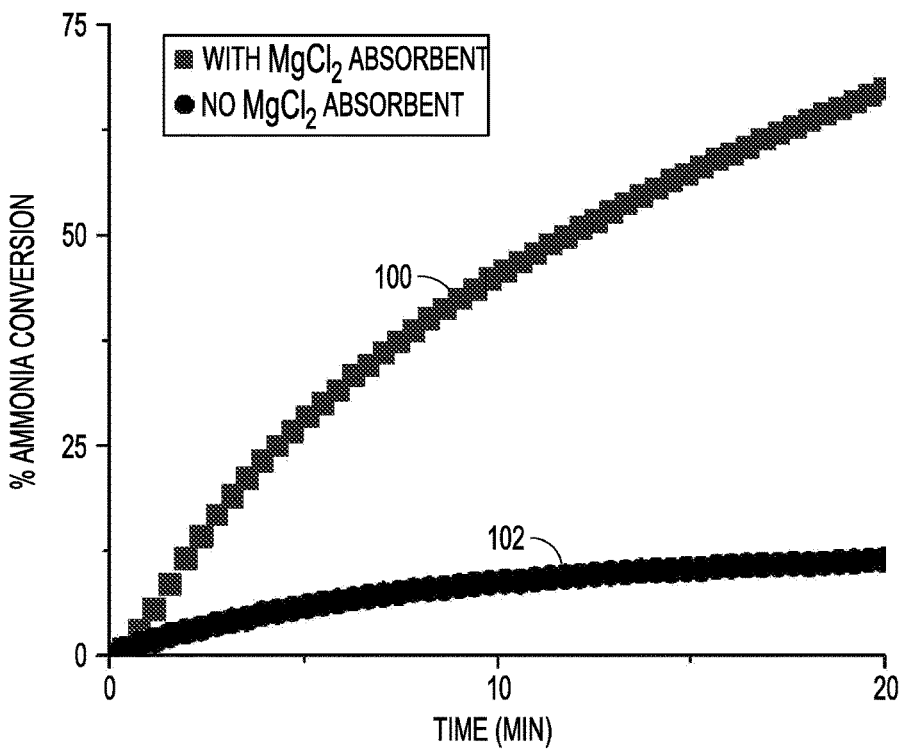
FIG. 2 is a graph showing conversion data of a system of FIG. 1 where a magnesium chloride absorbent is used in the absorber.

As shown in FIG. 2, the data series 100 for when $MgCl_2$ absorbent is present indicates an increase in ammonia conversion and the conversion rate compared to data series 102 when the $MgCl_2$ absorbent is not present. As shown by data series 102, when no $MgCl_2$ is present the reaction only achieves about 13% conversion in 20 minutes, and a final equilibrium conversion of about 16.3%. As shown with data series 100, when the $MgCl_2$ absorbent is present, 70% of the available nitrogen and hydrogen have been converted to ammonia after 20 minutes. If the reaction is allowed to run to completion, conversions of >95% were obtained.

Figure 3:
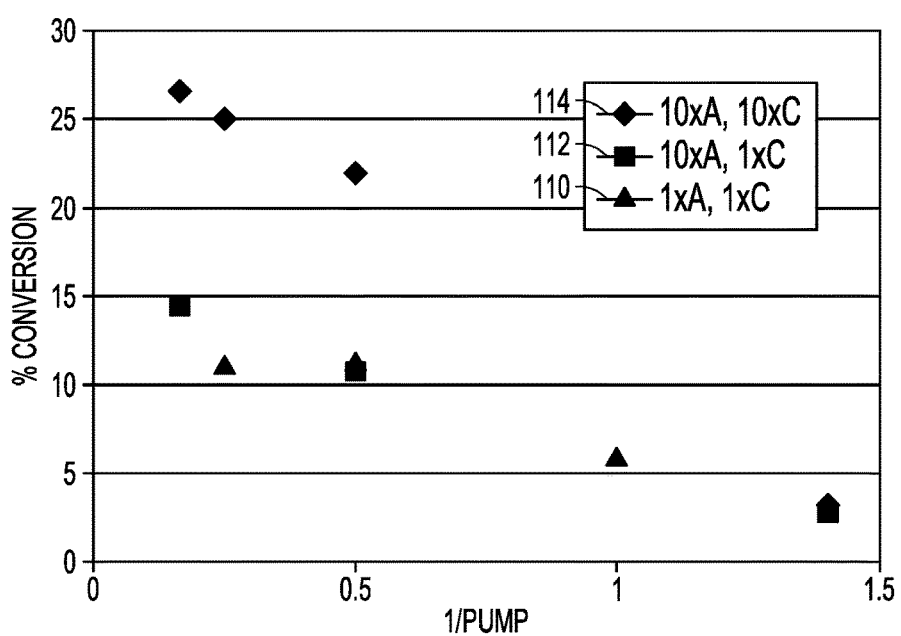
FIG. 3 is a graph showing conversion data comparing the conversion to ammonia based on recycle flow rate for various catalyst and magnesium chloride absorbent loading.

FIG. 3 shows the relationship between $NH_3$ conversion and the recycle flow rate within the system. FIG. 3 plots the percent conversion after about 5 minutes on the Y-axis versus the inverse of pumping speed of the recirculation pump 44, which is directly related to the recycle flow rate produced by the recirculation pump 44.

Data series 110 in FIG. 3 shows the resulting data for a first arbitrary amount of catalyst 14 in the reactor 12, in this case about 1.5 g of catalyst, and a first arbitrary amount of $MgCl_2$ absorbent 19 in the absorber 16, in this case about 1.5 g of $MgCl_2$ absorbent 19. Data series 112 shows the resulting data for the same first arbitrary amount of catalyst 14 in the reactor 12, e.g., 1.5 g of catalyst 14, but with a larger, second arbitrary amount of $MgCl_2$ absorbent 19 in the absorber 16 that is 10 times greater than the first arbitrary amount of $MgCl_2$ absorbent 19, e.g., about 15 g of absorbent 19. A comparison of data series 110 and data series 112 shows that increasing the amount of $MgCl_2$ absorbent 19 in the absorber 16 seems to have little to no effect. Data series 114 shows the resulting data for a second arbitrary amount of catalyst 14 in the reactor 12 that is 10 times greater than the first arbitrary amount of catalyst 14, e.g., about 15 g of catalyst 14, and for the second arbitrary amount of $MgCl_2$ absorbent 19 in the absorber 16 that is 10 times greater than the first arbitrary amount of $MgCl_2$ absorbent 19, e.g., about 15 g of $MgCl_2$ absorbent 19. A comparison of data series 112 and data series 114 shows that increasing the amount of catalyst 14 in the reactor 12 by a factor of 10 increases conversion to $NH_3$ by a factor of about 2.

Example 2

Theory

In order to better describe the systems described herein, such as system 10, the following theory regarding the mechanism of conversion to $NH_3$ and absorption of $NH_3$ will be described. Because the reaction reduces the number of moles in the system as shown in Reaction [9], there is a change in total pressure in the system over time.

$$N_2 + 3H_2 \rightleftharpoons 2NH_3 \qquad [9]$$

The system involves three rates: that of reaction, that of absorption, and that of convection, i.e., that due to the pump. The reaction making ammonia is, under practical conditions, controlled by nitrogen absorption on the catalyst. Under many important conditions, the rate $r_{N_2}$ of nitrogen consumption per reactor volume, $r_{N_2}$, is given by the Temkin-Pyzhev equation, shown as Equation [10]:

$$r_{N_2} = -k_R p_{N2} \left( \frac{p_{H_2}^3}{p_{NH_3}} \right)^\alpha + k'_R \left( \frac{p_{NH_3}^2}{(p_{H_2})^3} \right)^{1-\alpha} \qquad [10]$$

where $p_i$ is the partial pressure of component "i", $k_R$ and $k'_R$ are forward and reverse reaction rate constants, and a is a parameter close to one half. While this equation often successfully correlates experimental data, it is less successful at low partial pressures of ammonia. That is the case studied here. In this limit, an alternative expression is shown in Equation [11]:

$$r_{N_2} = \frac{-k_R p_{N_R}}{(1 + K p_{NH_3} / p_{H_2})^\beta} \cong -k_R p_{N_2} \qquad [11]$$

where $k_R$, K, and $\beta$ are different kinetic constants. The inventors have assumed that in experiments absorption keeps the ammonia pressure low, providing for simple linear kinetics on the extreme right of Equation [11].

Experiments have shown that the absorption rate per absorbent volume of pure low pressure ammonia by magnesium chloride, $r_{NH_3}$, can be explained at small times by the penetration theory of mass transfer according to Equation [12]:

$$r_{NH_3} = \left(\sqrt{\frac{D}{\pi t}}\frac{Ha}{RT}\right)p_{NH_3} \qquad [12]$$

where D is the diffusion coefficient of ammonia in solid $MgCl_2$, t is the time, a is the absorbent area per bed volume, and H is a partition coefficient between solid and gas. In system 10, ammonia can be absorbed from a high pressure mixed gas, ammonia concentration gradients may exist both in the solid and in the mixed gas. Therefore, the inventors have postulated that the rate per absorbent volume, $r_{NH_3}$ can also be defined by Equation [13]:

$$r_{NH_3} = k_A a(p_{NH_3} - p^*_{NH_3}) \qquad [13]$$

where $k_A$ is an overall mass transfer coefficient for absorption and a is the absorbent area per absorbent volume. The effective equilibrium partial pressure may be high if the amount of absorbent is so limited that it is saturated.

Next, these rate processes and the flow through the recycle line 32 can be combined to find the overall rate of the process. In experiments, such as in the Examples below, the gas flow rates have been about 2 L/min, and the entire equipment volume has been about 0.3 L, so the cycle times is under 10 sec, much shorter than the total time of the experiments. Thus, a single cycle is near steady state, even though the total experiments are unsteady.

A mass balance on the ammonia in the reactor can be performed, where it is assumed that the reactor is well-mixed due to its relatively small size, which is represented by Equation [14]:

$$0 = Q(p_{NH_3} - p'_{NH_3}) + 2k_R V_R(p'_{N_2} - p'_{NH_3}/K) \qquad [14]$$

where $p_i$ and $p'_i$ are the inlet and outlet partial pressures of species "i," respectively, Q is the flow rate, $V_R$ is the reactor volume, and K is an apparent equilibrium constant for the ammonia synthesis reaction. A similar balance on the ammonia in the absorber can also be performed, where again it is assumed that the absorber is well mixed, represented by Equation [15]:

$$0 = Q(p'_{NH_3} - p_{NH_3}) - k_A a V_A(p_{NH_3} - p^*_{NH_3}) \qquad [15]$$

where $p_i$ and $p'_i$ are now the outlet and inlet partial pressures of species "i," respectively, $V_A$ is the solid absorbent volume, and $p^*_{NH_3}$ is the ammonia pressure that would be in equilibrium with the solid absorbent. There can also be a stoichiometric constraint, represented by Equation [16].

$$2(p_{N_2} - p'_{N_2}) = p'_{NH_3} - p_{NH_3} \qquad [16]$$

By combining Equations [14], [15], and [16], and assuming a pseudo-steady state approximation on ammonia gas—e.g., that ammonia produced equals ammonia absorbed—allows for the elimination of $p'_{N_2}$ and $p'_{NH_3}$ to provide Equation [17]:

$$p_{N_2} = \frac{p_{NH_3}}{K} + \left[\frac{k_A a V_A}{Q}\left(\frac{1}{K}+\frac{1}{2}\right) + \frac{k_A a V_A}{2k_R V_R}\right](p_{NH_3} - p^*_{NH_3}) \qquad [17]$$

At longer and after many cycles, an unsteady state balance on nitrogen in the full system volume, that is, both reactor and absorber, can be performed. The overall nitrogen atom gas balance, continuing the pseudo-steady-state assumption on ammonia gas occurring after the short transient buildup of ammonia, shows that twice the moles of nitrogen gas converted to ammonia gas equals the moles of ammonia absorbed by the solid, which provides Equation [18]:

$$2\frac{(V_R + V_A)}{RT}\frac{dp_{N_2}}{dt} = -k_A a V_A(p_{NH_3} - p^*_{NH_3}) \qquad [18]$$

Combining Equations [16] and [17] produces Equation [19].

$$2\frac{(V_R + V_A)}{RT}\frac{dp_{N_2}}{dt} = -\frac{p_{N_2} - p^*_{NH_3}/K}{\left[\frac{1}{2k_R V_R} + \frac{1}{Kk_A a V_A} + \left(\frac{1}{K}+\frac{1}{2}\right)\frac{1}{Q}\right]} \qquad [19]$$

As will be appreciated, the apparent rate constant for the reactor loop can increase with absorber rate and capacity, and it can also increase with flow rate. Both trends reflect improved removal of product ammonia from the reactor, thereby suppressing the reverse reaction. When absorption and pumping are fast enough, and the absorbent affords a low equilibrium ammonia partial pressure, Equation [19] suggests the best case where the rate observed approaches the forward reaction rate.

In most examples, pseudo-steady-state ammonia gas partial pressure can be assumed, producing Equation [20]:

$$\frac{dp}{dt} = -\frac{5}{2}\frac{dp_{N_2}}{dt} \qquad [20]$$

Neglecting the transient as the ammonia partial pressure builds up to the pseudo-steady-state value, which is approximated as Equation [21]:

$$p = p_0 - 5/2(p_{N_2,0} - p_{N_2}) \qquad [21]$$

This the reactor loop transient in terms of the total pressure p is approximated according to Equation [22]:

$$\frac{dp}{dt} = -k(p - p^*) \qquad [22]$$

where p* is the final equilibrium pressure, and k is an overall rate constant for these experiments, equal to the reciprocal of the product of $V_R$ and the quantity in square brackets in Equation [19].

Equation [22] can be used to analyze the data presented in the EXAMPLE below, merits some discussion. First, the final value of $p_{N_2}$ or p includes both the effects of reaction equilibrium (as K) and absorption equilibrium (as $p^*_{NH_3}$). Second, the three rate processes involved are harmonically averaged in k as resistances in series. The resistance of the reaction kinetics is $[1/k_R]$. The resistance of absorption is $[V_R/Kk_A a V_A]$; note this varies with reaction reversibility (as K) and with the amount of absorbent (as $V_A$). The resistance also depends on the size of the absorbent particles, for a equals (6/d) where d is the absorbent particle size, the diameter for spheres or the side for cubes. The resistance of the pump, that is, the delay in moving the ammonia from the reactor to the absorber, is represented by the term containing the flow Q. We will use these approximate expectations as a basis for discussing the experiments, described next.

Materials

Reagent grade anhydrous magnesium chloride ($MgCl_2$), purchased from Sigma Aldrich, was used without further purification. 1.5 g of a pre-reduced magnetite ($Fe_3O_4$) catalyst, sold under the trade name AmoMax-10 from Süd-Chemie, was used for each experiment. Both the $MgCl_2$ and catalyst were stored in an inert nitrogen environment. The gases $N_2$, $H_2$, Ar, and He (ultrahigh purity; 99.9995%) were purchased from Matheson Trigas. Brooks 0-5 VDC mass flow controllers were used to control gas supply from the pressurized cylinders. Liquid nitrogen was purchased from Matheson Trigas in a 160 L dewar.

Apparatus

A lab-scale apparatus, similar to that shown schematically in FIG. 1, was built using Swagelok 316 stainless steel tubing. The reactor and absorbent vessels were of 1 inch diameter tubing. The catalytic reactor, 4 inches long and containing the magnetite catalyst, was positioned upstream from an absorbent vessel containing the $MgCl_2$ crystals. One of two absorbent vessels was used: the smaller was 2 inches long, and the larger was 5.5 inches long. Both the catalyst and $MgCl_2$ were supported on quartz wool. Heating tapes connected to Variacs were used to control the temperatures in the reactor and the absorbent vessel, which were measured by Omega KMTIN-032U-12 thermocouples within the vessels. A Micromega CN77000 programmable PID controller was used to maintain the temperature within the catalyst bed in the reactor. A WIKIA pressure transducer (Model #8392476) mounted directly before the reactor, and a US Gauge 0-2000 psig analog pressure gauge, placed after the absorbent bed, were used to measure system pressure. The system was operated as a circulating batch system with a variable speed piston pump (Model PW2070N, Pump-Works, Minneapolis. Minn.) powering the flow of gases through the system. An Agilent 6890 gas chromatograph was used to analyze gas phase composition. A Hewlett-Packard Plot Q 30 m×0.32 mm 20 μm capillary column-HP 19091P-Q04—was used to analyze 1 mL gas samples for hydrogen, nitrogen, and ammonia. Both the reactor and absorbent vessel could be isolated for detailed experiments. National Instruments Labview software was used to control and record data from the mass flow controllers, actuator, and pressure transducer.

An Agilent 6890 gas chromatograph with a Hewlett-Packard Plot Q 30 m×0.32 mm 201 m capillary column (HP 19091P-Q04) was used for analysis of gas compositions. Helium was used as an inert carrier at constant makeup rate. A trace amount of argon was added to the reaction system with the nitrogen and hydrogen for use as an inert in GC analysis. A Swagelok SS-4BMW bleeder valve installed downstream of the absorbent vessel was used to obtain small gaseous samples periodically. One ml of each sample was injected into the column for analysis. The column was held at −60° C. for three minutes during which time $H_2$, $N_2$, and Ar exited the column. The column was then heated at a rate 20° C. per minute for twelve minutes to elute the ammonia. Thus fourteen minutes were required to elute all four gases. The system took roughly four minutes to cool for the next injection. Since the amount of argon in the system remained constant, it was used to determine the response factor RF of the other gases according to Equation [23]:

$$RF = \frac{F_{gas}}{A_{gas}} \div \frac{F_{inert}}{A_{inert}} = \frac{F_{gas}}{F_{inert}}\left(\frac{A_{inert}}{A_{gas}}\right) \quad [23]$$

where F is the flow of the gas of interest, and A is the area under the peak. Once the response factors for $N_2$, $H_2$, and $NH_3$ based on Ar were calculated, they were used to determine the amount of the gas of interest. System conversion was then calculated based on $N_2$ and $H_2$ measurements. The average of these two values was reported as percent system conversion, as shown in Equations [24] and [25]:

$$\% \, Conv_{N_2} = 2*100*\left(\frac{N_2 - N_2^{initial}}{N_2^{initial}}\right) \quad [24]$$

$$\% \, Conv_{H_2} = \frac{2}{3}*100*\left(\frac{H_2 - H_2^{initial}}{H_2^{initial}}\right) \quad [25]$$

Agilent ChemStation software was used to control and record data from the gas chromatograph.

Procedure

To ensure that the catalyst was properly reduced, the catalyst was pretreated before any ammonia experiments were begun. New catalyst was added to the reactor and the reactor sealed. Stoichiometric nitrogen and hydrogen were flowed through the reactor vessel while slowly heating the reactor to 400° C. over 16 hours. The reactor was then held at 400° C. for 24 hours while flowing nitrogen and hydrogen to ensure the protective coating was burned off and the catalyst fully reduced. During the entire reduction, the system pressure was held at 8 MPa using a CPU-controlled actuator at the system exit.

For each experiment, the reactor vessel was preheated to 400° C. over two hours and held at that temperature for one hour before the experiments began. If the absorbent vessel was used during the experiment, it was preheated to 200° C. over two hours and held at that temperature for one hour as with the reactor. Before the first experiment, the system was flushed with $N_2$ at 1 SLPM for 30 minutes. A similar flushing was performed for 15 minutes following each experiment. All system contents were flared to exhaust during the $N_2$ flushing and when emptying the system after each experiment.

To pressurize the system, the system exit valve was closed. Most experiments used either the reactor alone or the reactor and the absorbent vessel. Mass flow controllers were then used to feed $N_2$ and $H_2$ into the system at a molar ratio of 1:3, along with a trace amount of Ar to assist in chromatographic analysis. The recirculating pump, when used, was turned on at the beginning of system pressurization. The recirculation rate was varied from 0.5-6 SLPM. Once the system reached the operating pressure of 80 bar, the feed valve to the system was closed and the mass flow controllers turned off. The system was allowed to react for at least 45 minutes. Small gas samples were pulled from the system using the bleeder valve every ~20 minutes for analysis. Once the experiment was complete, the system exit valve was opened, the system contents completely emptied and flared to exhaust, and $N_2$ flushed through the system for 15 minutes.

Experiments focusing on strictly the absorption of NH$_3$ by MgCl$_2$ were operated in a slightly different manner. First, the system consisting of the reactor and recycle line only was reacted to equilibrium, which took roughly three hours. This resulted in a NH$_3$ gas phase mole fraction of 15.6±0.3. The three-way valves were then quickly operated in a way to introduce the gases produced into the empty, pre-heated absorbent vessel. The pressure in the absorbent vessel was monitored. This allowed the absorption kinetics of the MgCl$_2$ to be studied at higher total pressures than possible using pressurized NH$_3$ cylinders.

Results

The conversion rate of nitrogen and hydrogen to ammonia via the Haber-Bosch process is a function both of catalyst activity in gases and of diffusion in solid magnesium chloride. The rates and the mechanism for this conversion are the focus of the experiments reported herein.

Figure 4:
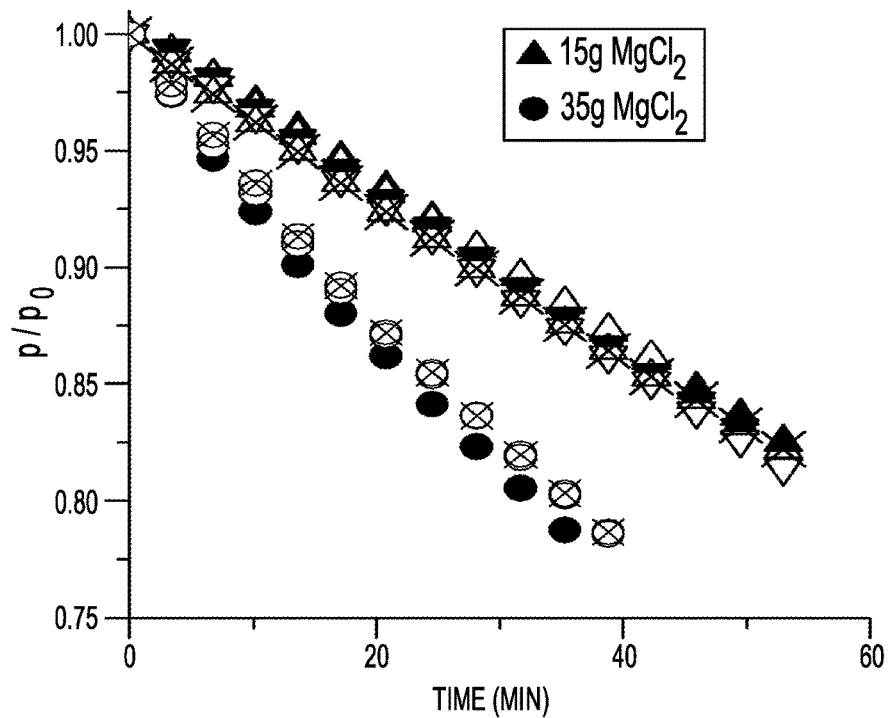
FIG. 4 is a graph showing data from repeated measurements of ammonia synthesis and absorption with the reactor being operated at 400° C. and an absorber operated at 200° C. with a magnesium chloride absorbent.

Data illustrating the reproducibility of these experiments are shown in FIG. 4. Normally, the key measurement is of the system's total pressure as a function of time. The system is initially charged with stoichiometric amounts of nitrogen and hydrogen to an initial temperature of 400° C. Two groups of such experiments, shown in FIG. 4, used 1.5 g catalyst with either 15 or 35 g MgCl$_2$ absorbent. The system's pressure p, normalized with its initial pressure of 80 bar, decays with time as shown with a reproducibility of ±3%. This was typical of all our measurements.

The better conversion effected by the presence of the absorbent MgCl$_2$ is illustrated in FIG. 4. Each of these groups of experiments used 1.5 g catalyst; all but one also used magnesium chloride in the amounts shown. The conversion at a given time is dramatically improved by adding absorbent. Only 1.5 g of absorbent increases conversion by 12 times. 15 and 35 g MgCl$_2$ absorbent increase conversion 13 and 18 times, respectively.

The reasons for these increases in conversion vary, as suggested by the theory summarized by Equations [19] and [22] above. If Equation [22] is integrated for small conversion, it produces Equation [26]:

$$\frac{p - p^*}{p_0 - p^*} = e^{-kt} \quad [26]$$

Figure 5:
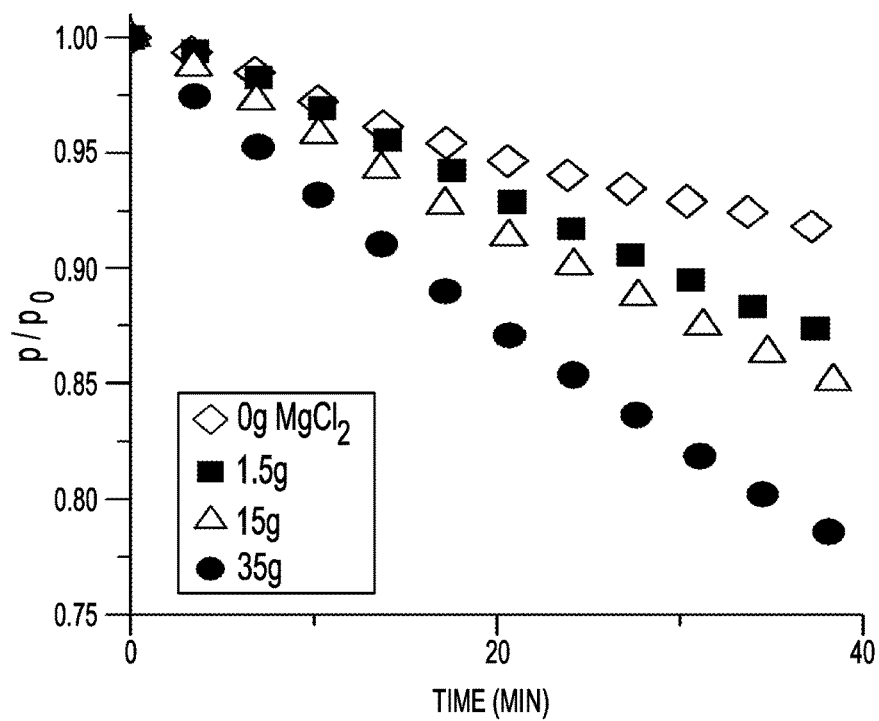
FIG. 5 is a graph showing data of reactor pressure versus the amount of a magnesium chloride absorbent.
Figure 6:
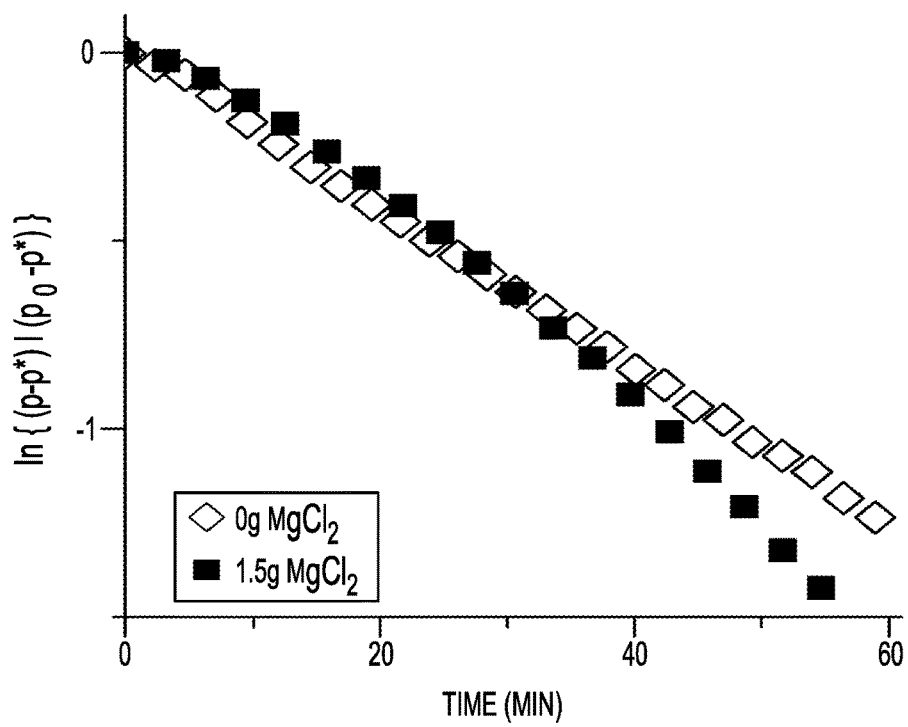
FIG. 6 is a graph showing data from the reaction with minimal absorption.

A plot of the logarithm of the left hand side of Equation [26] should be linear in time, which is confirmed in the data shown in FIG. 6. As shown in FIG. 6, the initial slopes of the data for 0.0 and 1.5 g absorbent are substantially the same, even though the degree of conversion shown in FIG. 5 is different. From these slopes, it can be inferred that the catalyst activity is about 0.38 kg NH$_3$/hr kg catalyst. This agrees with values in the literature, which range for 0.3 to 0.4 and average 0.35 in the same units. This difference between FIGS. 5 and 6 largely reflects the altered overall equilibrium, even while the apparent initial rate is almost the same. This implies that under these conditions, the overall rate constant k is almost independent of the amount of MgCl$_2$ because so little of it is added.

Figure 7:
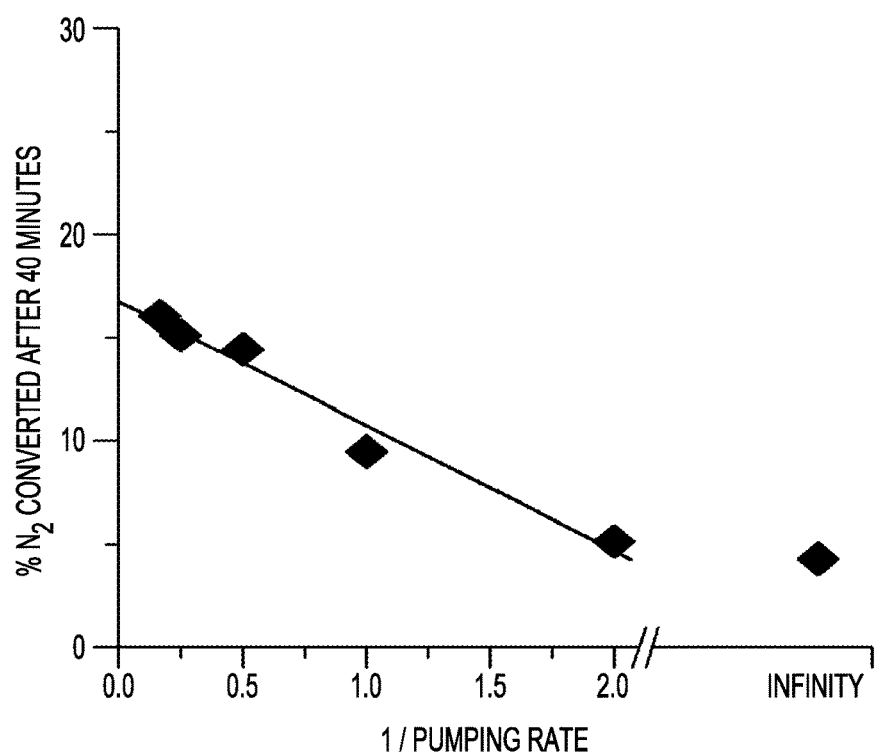
FIG. 7 is a graph showing data from the reaction without absorption versus the pumping rate.

The resistances of chemical kinetics and of flow both matter, as shown by the experiments without any MgCl$_2$ absorbent, shown in FIG. 7. In FIG. 7, the conversion is plotted vs. the reciprocal of flow rate: the line showing nitrogen conversion equals (16.8-6.1 (pumping rate)$^{-1}$). Low flow rates can result in low conversion because the reaction is slowed by the reverse reaction as the ammonia produced is allowed to stay longer and reach higher concentration in the reactor, and the empty absorber isn't helping except by diluting the product.

Figure 8:
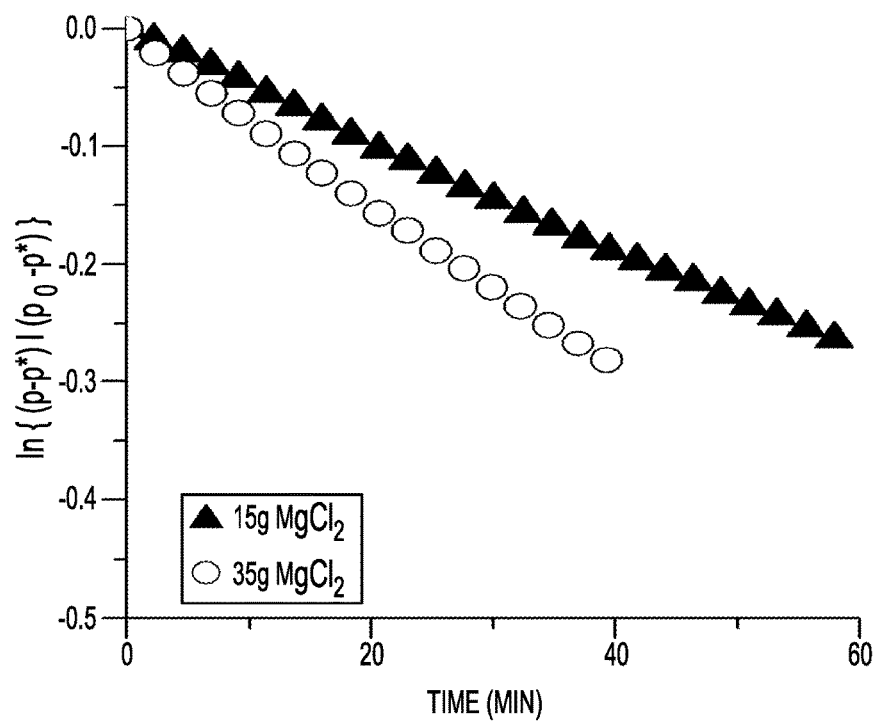
FIG. 8 is a graph showing data from the reaction with absorption by a magnesium chloride absorbent versus time.

The kinetics for larger amounts of absorbent also fit the first order kinetics of Equation [26], as shown in FIG. 8. However, the rates, which include the effect of equilibria lowered by ammonia absorption, show a clear effect of the absorbent amount, e.g., more absorbent raises the apparent rate constant. This is consistent with Equation [19], which suggests that in the limit of high absorption rate and flow rate, one could achieve a forward reaction rate dominated by chemical kinetics.

Figure 9:
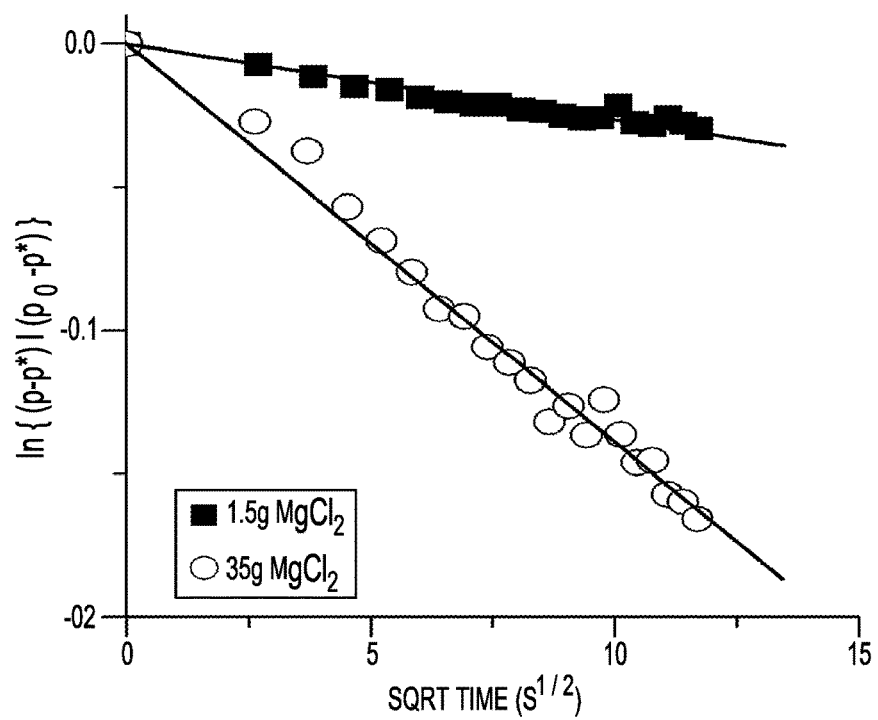
FIG. 9 is a graph showing data from absorption of ammonia by a magnesium chloride absorbent without additional reaction.

A difficulty remaining in this analysis is demonstrated, however, by a somewhat different set of experiments where the system is started and run until some ammonia has been made. Then, the absorber is isolated from the reactor by closing inlet and outlet valves, and the absorber pressure is measured as a function of time. The results do not show the variation suggested by Equation [26], which is log linear in time. Instead, the logarithm of pressure varies with the square root of time, as shown by the results in FIG. 9. Such behavior is a common characteristic of a diffusion-controlled process, in particular where the data is consistent with the penetration theory of mass transfer. This is true both when absorption occurs from the N$_2$—H$_2$—NH$_3$ mixtures used here and from pure ammonia, as demonstrated in the literature. However, the details of the rate-limiting step in the literature are not completely clear. The ratio of the slopes of the lines shown in FIG. 9 is 5.3:1. If mass transfer were the only concern, the ratio of the slopes should be the ratio of the absorbent surface areas, which is $(35/1.5)^{2/3}$, or 8.2:1. The reason for this discrepancy is not clear, but may reflect altered absorbent geometry. In addition, the partition coefficient measured here at 200° C. was 0.0367 g NH$_3$/atm cm$^3$ MgCl$_2$. The average earlier value in the literature between 172 and 235° C. was similar but smaller, 0.012 in the same units.

Figure 10:
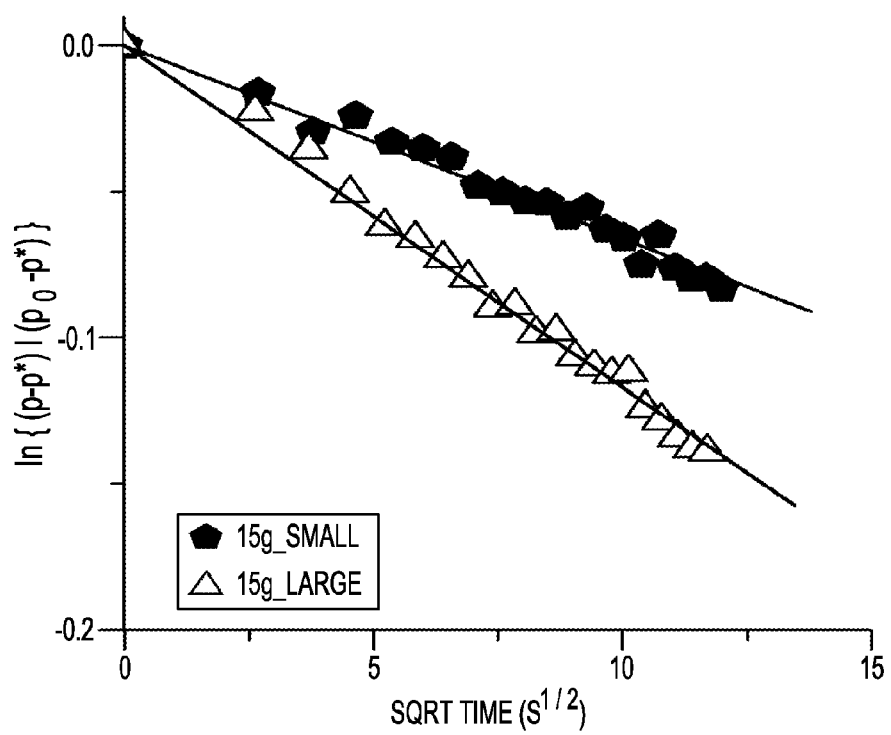
FIG. 10 is a graph showing data from absorption by a magnesium chloride absorbent in different beds.

While the results in FIG. 9 imply that absorption can be controlled by diffusion only in the solid, the inventors are not sure whether this is always completely true. In one attempted redesign of the absorber, 15 g MgCl$_2$ was diluted with a roughly equal volume of glass beads. As shown in FIG. 10, absorption rates in this diluted bed are 1.8 times faster than those in the undiluted bed, strongly indicating diffusion in the gas adjacent to the particles is important. In particular, the data in the small bed—the pentagons—have a slope of 0.0066, but the results for the diluted bed—the triangles—have a slope is 0.0117, or a ratio of 1.77. This suggests that the mass transfer coefficients are larger when the bed is diluted, indicating a mass transfer resistance in the gas phase as well as in the solid.

The theory and experiments above show how the conversion of nitrogen and hydrogen into ammonia can be increased with a solid ammonia selective absorbent. Ammonia synthesis is exothermic, and so occurs spontaneously at ambient temperature and pressure. However, the rate can be very slow, in some examples so slow that practical amounts of ammonia are not produced. To overcome this, Haber famously used a catalytic reaction at high pressure and temperature. The high pressure enhanced ammonia conversion because the number of moles in the reaction decreases. The high temperature increased the reaction rate, but at the expense of reducing the equilibrium conversion. Commercial reactors are currently run at high pressure and temperature with only perhaps 20% conversion, which necessitates cooling the product gases, separating the ammonia, and recycling the unreacted hydrogen and nitrogen.

The data in this Example suggests one way of potentially removing the need for nitrogen and hydrogen separation and recycling. It shows that an ammonia-selective absorbent, such as $MgCl_2$, can dramatically increase the conversion. In the simplest case studied here, shown in FIG. 11, the conversion is increased from around 20% to over 95%. If larger amounts of absorbent are used, even higher conversion may be possible.

However, this conclusion can be clouded by the interaction of kinetics and equilibria. The kinetics includes those of chemistry, of flow, and of absorption, as summarized by Equations [19], [22] and [26]. The equilibria involve those of both reaction and absorption. These can complicate the interpretation of the data.

To illustrate this, consider the kinetics shown in FIG. 5, which shows the changes in total pressure as a function of time. The pressure changes for catalyst without absorbent may first appear to be less than those caused by catalyst plus absorbent, at least at larger times. But, according to Equations [19] and [22] this cannot be true at very small times. Specifically, when additional kinetic resistances from flow or from absorption are added, then the rates cannot be faster than that expected for the reaction alone. To be sure, the rate of absorption shown in FIG. 6 is initially extremely fast, but even this would just make the initial overall rates of the two processes have the same, kinetically-limited speed. However, the experiments described in this Example could not reliably be made at such small times that no sort of equilibrium affects the measurements. When the data like those in FIG. 5 is examined, it should be remembered that conversion can be affected by both kinetics and equilibria.

Figure 11:
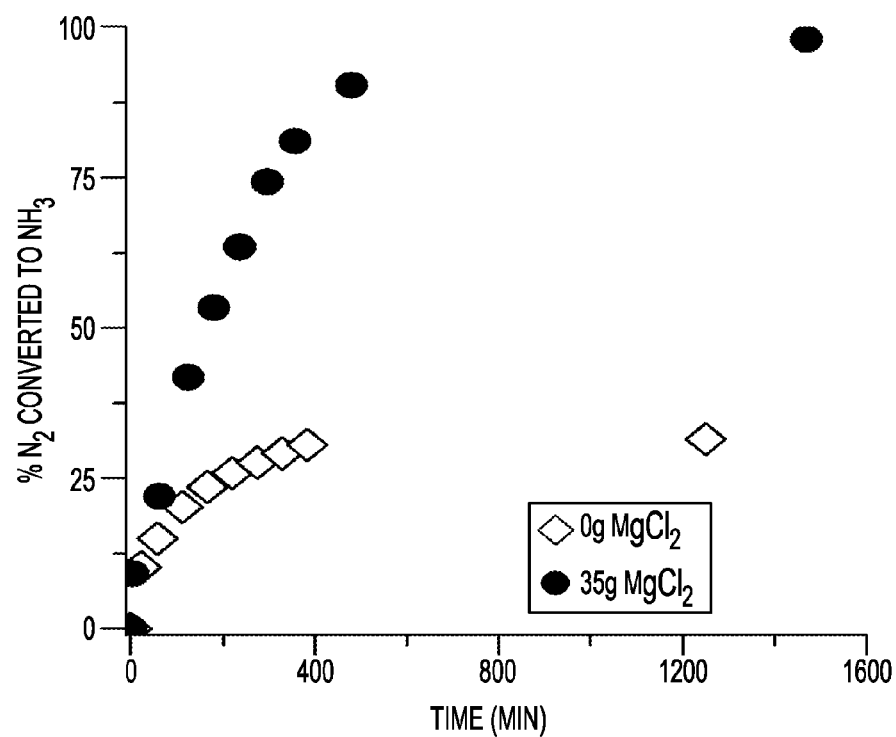
FIG. 11 is a graph showing data on conversion with a magnesium chloride absorbent and without.

This complexity can influence strategies about how to reduce the time required for high conversion, which FIG. 11 shows can be much higher when the absorbent is present. In particular, for the conditions shown, the conversion with an absorbent can takes about forty times longer than that with catalyst alone. It is believed that the absorbent kinetics can be increased in at least three ways: by increasing the absorbent volume, by decreasing the absorbent particle size, or by frequently regenerating the absorbent.

To increase the absorbent kinetics forty times, e.g., to account for the longer time required to achieve conversion with the absorbent, the volume of the absorbent particles could simply be increased by forty times. This will reduce the resistance to solid diffusion by forty times by changing the term $(Kk_A aV_a)$ in Equation [19]. This should conceivably work for the conditions in FIG. 11, but the further increase in absorbent volume will have less effect because the rate of ammonia production will now more nearly be controlled by chemical kinetics. But, because it appears there will already be enough capacity for ammonia from the results in FIG. 11, it can result in considerable excess capacity in the larger absorber. However, the absorbent is inexpensive.

Alternatively, smaller absorbent particles can be used to provide a larger surface area and get similar results. For example, if four times more volume of 20 μm particles were used (instead of 200 μm particles), it would, theoretically, result in the same change in the term $(Kk_A aV_a)$. Such smaller particles are often used in separation processes to get faster mass transfer rates, though these particles will risk higher pressure drops through a packed bed in an absorber. To get both fast kinetics and low pressure drop, absorbent particles 20 μm or smaller could be used that are supported on 200 μm glass beads.

A third method of accelerating the absorption step is to regenerate the absorbent frequently. The gain in doing this can depend on the fact that the chemical kinetics is first order in time, but that the absorption varies with the square root of time (see, for example, FIGS. 6 and 9). Thus, absorption is fastest at small times, always faster than kinetics. Better conversion can be achieved if frequent regeneration of the absorbent particles is performed. A variety of cycle times for doing so were considered, recognizing the strong parallels with pressure swing absorption, but the process has not been studied sufficiently to provide a basis for intelligent choice between these. We do want to emphasize, however, that this is still another way to accelerate absorption.

The inventors have also considered whether the catalyst and the absorbent can function better in a separate reactor and absorber, or whether they can work better in one combined piece of equipment. In most chemical syntheses, the reaction and separation are better carried out in two separate pieces of equipment because each process can be optimized via the specific conditions used. Some of this optimization has been performed in this Example, e.g., running the reactor at 400° C. and the absorber at 200° C. The higher reactor temperature can give faster kinetics; and the lower absorber temperature can give more favorable absorber equilibrium. In addition, separate equipment can provide for easier separation and regeneration of a loaded absorber without changing the conditions in the reactor. Thus, the reactor can continue to operate at what is basically a steady state, even while different absorbers are cycled in and out of the system. The idea of a separate reactor and absorber can also offer the chance of effective heat integration in larger scale systems. While both the reaction and absorption is exothermic, the desorption needed for $MgCl_2$ salt regeneration is endothermic. The obvious process improvement is to use reactor heat to regenerate the $MgCl_2$ absorbent.

At the same time, the prospect of putting catalyst and absorbent particles in the same piece of equipment is intriguing because it would simplify the process, for example because there would be no need for a recycle line, a recirculation pump, or any extra heat exchange equipment, which could result in a very simple ammonia synthesis process suited for distributed manufacture. In such manufacture, a single site, such as a farm, could potentially make its own fertilizer. However, in preliminary experiments, it was found that mixing catalyst and absorbent gave poor results. Without wishes to be bound by any theory, the inventors suspect that the $MgCl_2$ as received may contain small amounts of water, especially since this salt does form a variety of stable hydrates. The water in these hydrates would be expected to spoil Haber process catalyst. It could be possible to fuse the absorbent and then grind it under dry conditions to insure that no water is present, but experiments to these effects were not conducted at this time.

The terms and expressions which have been employed are used as terms of description and not of limitation, and there is no intention that in the use of such terms and expressions of excluding any equivalents of the features shown and described or portions thereof, but it is recognized that various modifications are possible within the scope of the inventive subject matter claimed. Thus, it should be understood that although the embodiments of the present invention have been specifically disclosed by examples and optional features, modification and variation of the concepts herein disclosed may be resorted to by those of ordinary skill in the art, and that such modifications and variations are considered to be within the scope of the subject matter of the present invention as defined by the appended claims.

Example 3

Theory

The following model was developed to describe the reaction-separation process with recycle, which provides a framework to conduct and analyze experiments. The theory can help understanding of the complex behavior of reaction-separation process, and can also make it easier to compare the findings of this Example. However, the specifics of the theory should not be construed as limiting unless they are included in the claims below.

In the simplified model, it is assumed that the process is in steady state, and that the reactor and absorber are each well mixed. The inventors have found that the steady state assumption is accurate, but typically only at the beginning of a cycle. The well mixed assumption implies that average nitrogen concentration in the reactor equals the nitrogen concentration at the exit. This assumption is not necessarily true if most of the nitrogen entering the reactor reacts in a single pass, however, it is much more accurate when only a small fraction of the nitrogen reacts per pass, which is the case here. The model predicts the rate of ammonia production a according to Equation [27]:

$$a = \frac{x_A^* - x_A^0}{\frac{1}{k_R V_R} + \frac{1}{k_{ab} P_t S} + \frac{1-x_A^*}{m}} \quad [27]$$

where $x^*_A$ and $x_A^0$ are the mole fractions of ammonia at reaction equilibrium and in the absorber, respectively; $k_R$ and $k_{ab}$ are the linearized chemical reaction rate constant and the absorption mass transfer coefficient, respectively; $P_t$ is the operating pressure; S is the surface area of the absorber; and m is the total molar flow rate. In this result, the term $(1/k_R V_R)$ is the resistance to ammonia production due to the chemical reaction, $(1/k_{ab} P_t S)$ is the resistance of the absorber, and $(1-x^*_A)/m$ is the resistance of the recycle loop, respectively.

In this model the absorber's performance is assumed to behave as a first-order rate process. In reality, before the breakthrough of the absorber's packed bed, we have a perfect separation of ammonia from the gas mixture. Hence before breakthrough, the absorption resistance is effectively zero. After breakthrough, though, the production rate can become dominated by the raising absorption resistance.

The presence of three resistances in series is observed in many rate processes, where the amount produced is proportional to the overall driving force divided by the total resistance. The total resistance is the sum of the resistances of reaction, absorption, and recycle. Phrased in other terms, the total resistance is a harmonic average of the speeds of these three steps, so that the slowest speed has the biggest effect on the rate of ammonia production. If the reactor is operating at too low a temperature, the reactor resistance will be dominating. If the absorber is undersized, the absorption resistance can be largest. If the recycle rate is too low to take full advantage of the other unit operations, the recycle resistance will be most important.

The reaction rate constant can be estimated by starting with the Temkin-Pyzhev equation, e.g., from Equation [10] above, which can be rewritten as Equation [28]:

$$r = k_1 \frac{P_{N_2} P_{H_2}^{1.5}}{P_A} - k_2 \frac{P_A}{P_{H_2}^{1.5}} \quad [28]$$

where $k_1$ and $k_2$ are forward and reverse reaction rate constants, respectively; and $P_{N_2}$, $P_{H_2}$, and $P_A$ are the partial pressures of nitrogen, hydrogen and ammonia, respectively. Equation [28] can be further rewritten by defining a variable X according to Equation [29]:

$$X = \frac{P_A^* - P_A}{P_{N_2}^*} \quad [29]$$

Linearization using the Taylor series for small values of X simplifies to Equation [30]:

$$r = k_1 \frac{P_{N_2}^* P_{H_2}^{1.5*}}{P_A^*}\left[\frac{9}{4} + \frac{P_{N_2}^*}{P_A^*}\right](X - X^*) + \\ k_2 \frac{P_A^*}{P_{H_2}^{1.5*}}\left[\frac{P_{N_2}^*}{P_A^*} - \frac{1}{4}\right](X - X^*) = k_R'(X - X^*) \quad [30]$$

where $k'_R$ has the dimension of moles of ammonia per catalyst volume per time. The $k'_R$ is related to $k_R$, as demonstrated by Equation [31].

$$X = \frac{P_A^* - P_A}{P_{N_2}^*} = 4\left[x_A^* - \frac{x_A}{(1-x_A^*)^2}\right] \quad [31]$$

When the conversion is close to zero, which is the case in this analysis, $k'_R$ can be approximated according to Equation [32]:

$$k'_R \approx 4 k_R \quad [32]$$

where $k'_R$ is the corrected linearized reaction rate constant after change of variables. Equation [30] shows that the linearized reaction rate constants $k'_R$ and $k_R$ obtained here are functions of concentration. When $x_A$ approaches $x'_A$, $k'_R$ falls to zero; but when $x_A$ approaches zero, $k'_R$ goes to its maximum value, representing only the forward reaction rate.

Materials

Anhydrous $CaCl_2$ in granular form (>7 mm) with 93% purity (CAS#: 10043-52-4, Lot #: SLBL2770V) was purchased from Sigma Aldrich (St. Louis, Mo. USA). The reactant gases $N_2$ and $H_2$ with ultrahigh purity were purchased from Matheson Trigas (New Brighton, Minn.). The catalyst was a pre-reduced non-stoichiometric ferrous oxide catalyst (wustite) with promoters sold under the trade name AmoMax-10 RS from Clariant International Ltd., Charlotte, N.C., USA. The catalyst was provided in irregular shape granules, with the nominal size range of 1.5-3 mm, and was stabilized with an oxygen-rich protective layer.

Apparatus

An experimental lab-scale apparatus, similar to the system 10 shown in FIG. 1, was built using Swagelok 316 stainless steel tubing and fittings of 6 mm inner diameter. The reactor was 0.15 m long. Catalyst particles were ground from their produced size into smaller paricles (<1 mm), which were then loaded into the reactor. The absorber was a 0.3 m long stainless steel tube, with an inner diameter of 0.022 m, bundled with heating tape. The absorber, filled with the absorbent, and heating tape bundle were insulated with silica woven insulation (AVS Industries, New Castle, Del., USA). A variable piston pump (Model PW2070N, Pump-Works Inc., Minneapolis, Minn.) circulated the gas mixture between the reactor and the absorber.

An Omega ceramic heater (CRFC-36/115-A, Stamford, Conn., USA), equipped with an Omega multiramp PID controller (CN96211TR) controlled the temperature of the reactor. The inlet and outlet gas temperatures and the temperature on the outer surface of the reactor were measured using K-type thermocouples connected to an Omega signal conditioner (DRG-SC-TC). The system pressure was recorded using a pressure transducer (WIKA Model #50426877, Lawrenceville, Ga., USA) with a 0-10 $V_{dc}$ output. The experiments were carried out in a recirculation batch mode. All instruments and controllers were connected to a National Instrument Labview card (Austin, Tex., USA), with the data being recorded every second. Labview controlled Brooks Instrument mass flow controllers (Model # SLA5850S, Hatfield, Pa. USA) installed in the apparatus inlet, which injected known volumetric flows of reactant gases. The inlet and outlet of the system were equipped with needle valves.

Procedure

Three grams of catalyst, loaded in the reactor at room temperature, was activated by pumping hydrogen gas through the catalyst bed while slowly increasing the reactor temperature. Hydrogen gas was then pumped through the catalyst bed at the flow rate of 0.5 standard liters per minute (SLM). The hydrogen reacted with the coating layer, forming water vapor. A multiramp temperature profile heated the catalyst very slowly to ensure that the water vapor concentration during the activation is less than 1000 ppm. The temperature ramp took about 27 hours to increase from room temperature to 723 K. After the reactor reached 723 K, hydrogen flow continued through the reactor for at least 24 hours. After this initial activation, the apparatus was always kept under nitrogen.

Two sets of experiments were conducted for this EXAMPLE. During the first set, referred as "reaction experiments," the system was operating only to determine the kinetics of ammonia synthesis, such the absorber was bypassed and the gas mixture circulated only through the reactor. The effect of operating pressure on the reaction rate constants was investigated. In the second set of experiments, referred to as "reaction-separation experiments", the gas mixture was circulated between the reactor and absorber using the pump. This set of experiments was similar to the conventional Haber-Bosch process, except that a condenser was replaced with the absorber. In both sets of experiments, the pressure reading data log was used to calculate the ammonia reaction rates and conversion.

The reaction experiments utilized a 3-way valve to direct the circulation loop toward the bypass line, without the absorber. The catalyst remained unchanged throughout the experiments. The hydrogen and nitrogen were fed to the reactor with the ratio of 3 to 1. Flow was stopped and the inlet valve was closed the inlet valve once the system reached the desired pressure. After this, the pump started to recirculate the gas mixture with a flow rate of 0.7 mL/sec, and pressure data was collected. These conditions are summarized in Table 1.

TABLE 1

Conditions for Reaction and Reaction-Separation Experiments

|  | Reaction Experiments | Reaction-Separation Experiments |
| --- | --- | --- |
| Reaction Temperature (K) | 620 to 740 | 700 |
| Absorption Temperature (K) | — | 460 |
| Initial Pressure (bar) | 74 | 55 |
| H:N Ratio | 3:1 | 3:1 |
| Pump Flow Rate (mL/sec) | 0.7 | 0.7 |
| Reaction-Absorption Time (hrs) | 3 | 3 |
| Desorption Temperature (K) | — | 600 |
| Purge Flow (SLM $N_2$) | — | 100 |
| Desorption Time (hrs) | — | ~20 |

Unless otherwise mentioned, the reaction-separation experiments were carried out at 700 K. The 3-way ball valve included the absorber in the recirculation loop. The absorber was initially filled with approximately 70 g of fresh anhydrous $CaCl_2$ and was always kept at temperatures greater than 460 K. The absorber was purged with dry nitrogen for 24 hours at 673 K before starting the first test. The absorber and catalyst were unchanged throughout the experiments. An initial pressure of 55 bar was used, and the apparatus was fed with hydrogen and nitrogen gas mixture with the ratio of 3:1. The pump rates of 0.7 mL/sec recirculated the gas mixture for 3 hrs. After each test, the absorber was regenerated by heating to 600 K, decreasing the system pressure to 2-3 bar, and pumping nitrogen through the absorber at 0.1 standard liter per minute (SLPM) for 20 hrs. Details of these experiments are also summarized in Table 1.

Results

Reaction Experiments without Absorption

Figure 12A:
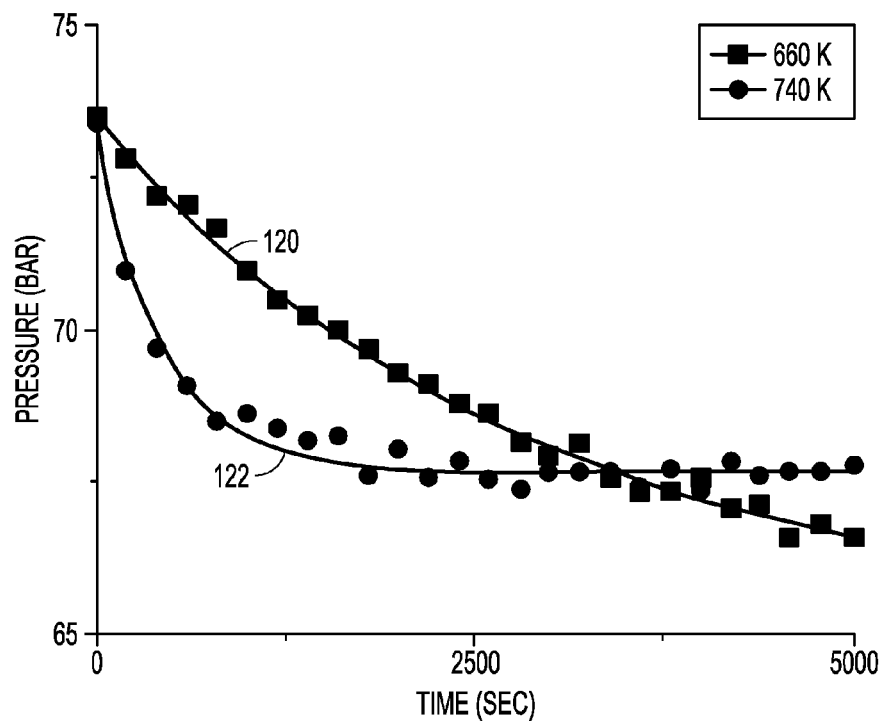
FIG. 12A is a graph showing the conversion over time for the catalytic reaction to ammonia at two different reaction temperatures in an example experimental reactor without absorption of the ammonia.

Several experimental runs were conducted to understand the reaction kinetics of the catalyst and to investigate the effect of operating temperature and pressure. FIG. 12A shows the pressure over time for the catalytic reaction of ammonia initially at 74 bar and at reaction temperatures of 660 K (data series 120) and 740 K (data series 122). The slopes of the pressure profiles represent the apparent rates of ammonia reaction at each operating temperature. As shown in FIG. 12A, the rate of reaction at 740 K (data series 122) is much faster than the rate at 660 K (data series 120), and is at rates which are in agreement with the literature. The reaction rate is initially fast, but quickly slows at longer times because the reverse reaction rate speeds up as the partial pressure of ammonia increases.

Figure 12B:
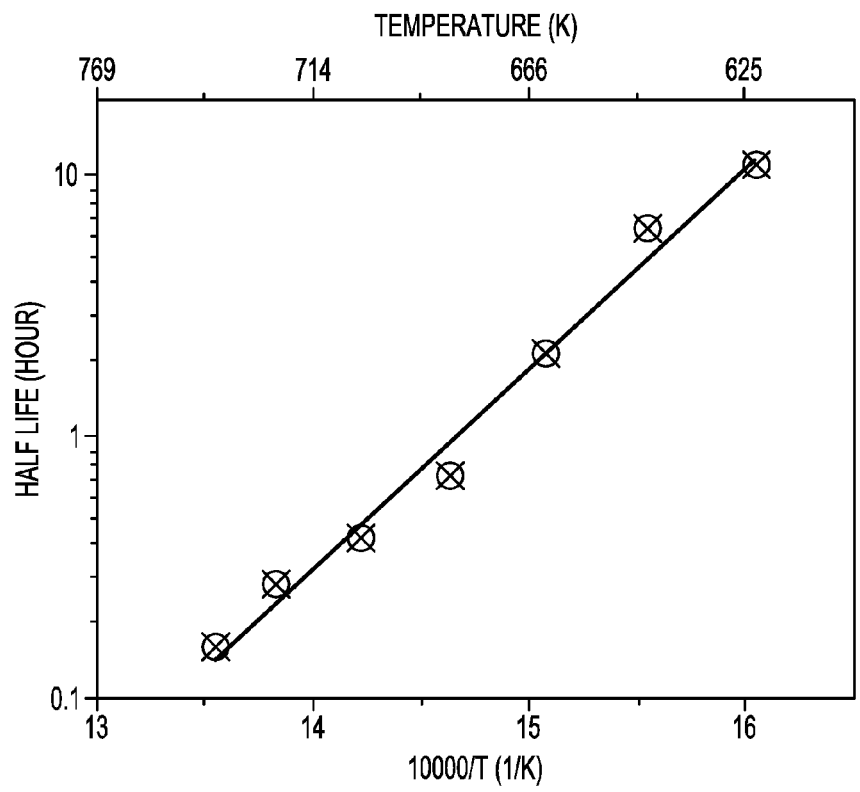
FIG. 12B is an Arrhenius plot of a reaction half-life versus the reaction temperature without absorption of the ammonia in the same experimental reactor used to provide the data in FIG. 12A.

The half-lives of reaction, an alternative representation of the reaction rates, are shown as an Arrhenius plot vs. temperature in FIG. 12B. To find the half-life from the pressure versus time profiles, the equilibrium conversion and final pressure at each specific temperature were calculated. Then the time at which the half-life operating pressure occurred was extracted. The half-lives range from 0.15 to 12 hrs. This variation in the half-life of reaction is evident in the pressure profiles as well. For instance, in the test at 740 K, the pressure reaches equilibrium after approximately 2000 sec, while the pressure at 660 K continues to decrease until 5000 seconds. This is in line with conventional knowledge of this reaction—e.g., that higher temperature is advantageous for reaction rate, while lower temperatures favor thermodynamic equilibrium.

Figure 13:
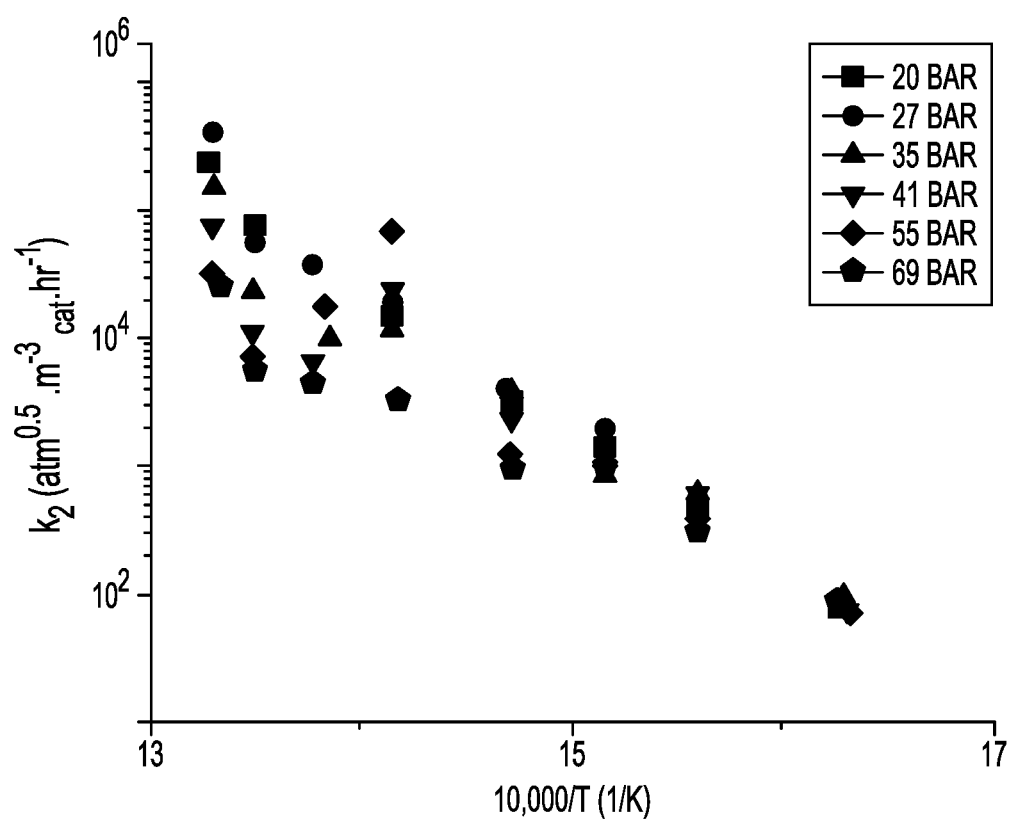
FIG. 13 is an Arrhenius plot of the reverse reaction rate versus the reaction temperature at various reaction pressures without absorption of the ammonia in the same experimental reactor used to provide the data in FIGS. 12A and 12B.

The operating pressure also affects the reaction kinetics, but by less than the temperature. FIG. 13 illustrates this for a variety of temperatures and pressures. FIG. 13 shows the reverse reaction rate constant in the form of an Arrhenius plot. Reverse reaction rate constants were chosen rather than the more directly measured forward rate constants because most previous literature on catalytic reaction of ammonia is rather focused on disassociation of ammonia, so more data is available on reverse rate constants. The reverse reaction rate constant is simply proportional to the forward reaction rate constant, as demonstrated by Equation [33]:

$$K_P^2 = \frac{k_1}{k_2} \quad [33]$$

with the stoichiometry of Reaction [34].

$$\tfrac{1}{2}N_2 + 3/2 H_2 \Leftrightarrow NH_3 \quad [34]$$

In Reaction [33], $K_P$ is the equilibrium reaction constant calculated from Gillespie et al., "The Thermodynamic Treatment of Chemical Equilibria in Systems Composed of Real Gases. I. An Approximate Equation for the Mass Action Function Applied to the Existing Data on the Haber Equilibrium," Phys. Rev. Vol. 36, p. 743 (1930), which includes fugacities that can alter the equilibrium reaction constant by a few percent.

The reverse reaction rate constants in FIG. 13 exponentially increase with temperature, but change less with pressure. Specifically, the rate constant increases by 10000 times when operating temperature is increased from 600 to 730 K, but the rate constant at 650 K varies by only a factor of two when the operation pressure is increased from 20 bar to 69 bar. At 740 K, there is an order of magnitude difference in the reaction rate constants at 20 and 69 bar, certainly significant but less than the variation with temperature. Lower operating pressures give larger reaction rate constants while higher operating pressures give lower ones. The tests at 20 and 28 bar show less variation, probably because the times to reach the operating pressures are smaller and more reproducible. Nevertheless, the experimental errors for reaction engineering in this range were found to be typical when compared to the literature.

Reaction-Separation Experiments

Figure 14B:
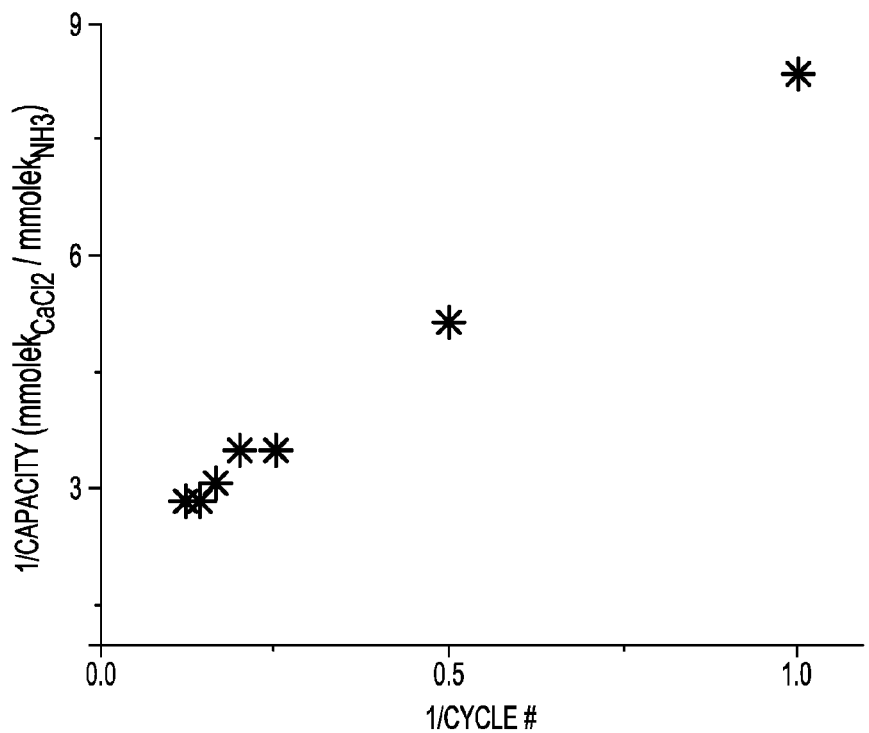
FIG. 14B is a plot of the reciprocal of the ammonia absorption capacity of the calcium chloride absorbent versus the reciprocal of the absorption/desorption cycle number in the same experimental reactor and experimental absorber used to provide the data in FIG. 14A.

As discussed above, it has been found that the absorption and desorption of ammonia on a $CaCl_2$ absorbent can change over time, for example due to the formation of a nanoporous structure in the $CaCl_2$ absorbent. Hence, the absorption rates into the $CaCl_2$ structure can change. Therefore, the reaction-absorption and then desorption cycles were repeated until reproducible results were obtained. The data is illustrated in FIG. 14A for the absorption phases of the first cycle (data series 140), the fourth cycle (data series 142), the sixth cycle (data series 144), the seventh cycle (data series 146), and the eighth cycle (148). The total pressure, our measure of reaction-separation, is linear with time during the first cycle 140. The pressure changes increase notably in subsequent cycles 142, 144, 146, and 148, consistent with a structural change in the $CaCl_2$. The initial production rates (slopes) are relatively fast, then the rates go through a transition region, and finally, they slow down to a very similar rate to the first cycle 140 for each of the cycles 142, 144, 146, and 148. The initial rates get faster after desorption of each cycle, and take longer to slow down. FIG. 14B is a plot of the reciprocal of the apparent ammonia capacity after 10,000 seconds versus the reciprocal of the cycle number, which as can be seen in FIG. 14B is a straight or substantially straight line. The 10,000 second time was chosen arbitrarily, but illustrates some of the implications of FIG. 14A. The intercept on FIG. 14B corresponds to the inverse capacity for an infinite number of cycles, that is, for the maximum change in the solid geometry. In this EXAMPLE, samples subjected to seven or more cycles, and were found to be within about ten percent of the maximum absorption which is obtainable at the operating temperature.

Figure 15:
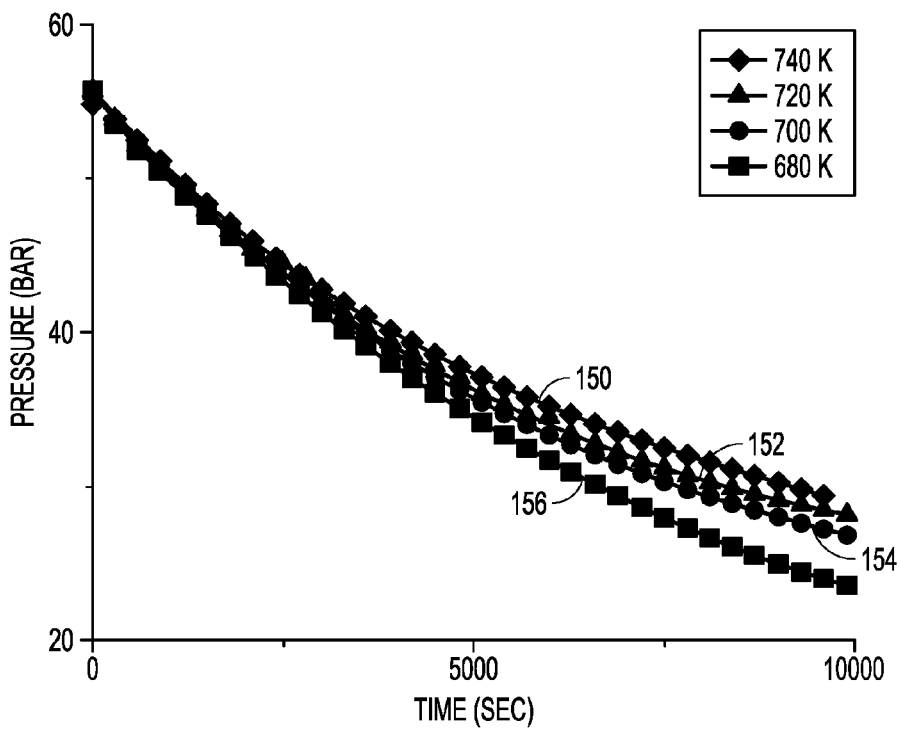
FIG. 15 is a graph showing the conversion over time at various reaction temperatures in the same experimental reactor and experimental absorber used to provide the data in FIGS. 14A and 14B.

To determine whether the chemical reaction is the rate-limiting step, tests were carried out at various reaction temperatures, while keeping all other conditions unchanged. FIG. 15 shows the data from these tests by plotting the pressure versus time for tests at reaction temperatures of 740 K (data series 150), 720 K (data series 152), 700 K (data series 154), and 680 K (data series 156). The results show that the initial overall rate is almost the same, independent of the temperature. Later, the rates at higher catalyst temperatures are systematically slower (e.g., with the 740 K reaction 150 being slower than the 720 K reaction 152, which is slower than the 700 K reaction 154, which is slower than the 680 K reaction 156). This implies that the overall kinetics are not controlled by catalytic reaction. It is also likely that with small reactor residence time and effective absorber operation, the reverse reaction for ammonia synthesis is not significant because the ammonia mole fraction is kept low.

Figure 16:
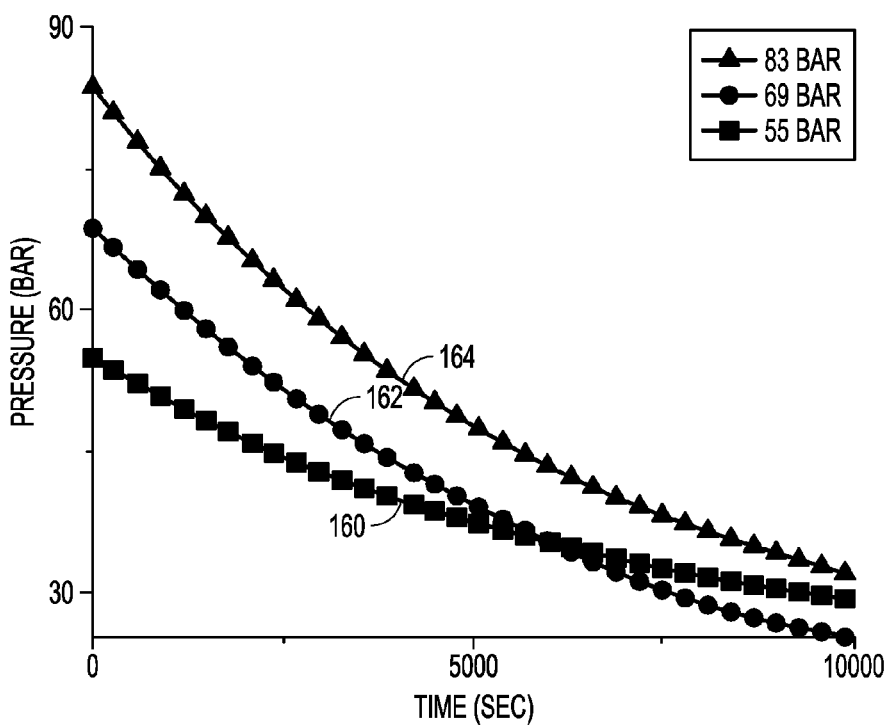
FIG. 16 is a graph showing the conversion over time at various system operating pressures in the same experimental reactor and experimental absorber used to provide the data in FIGS. 14A, 14B, and 15.

It was also found that the initial rate of reaction is proportional to the system operating pressure. This is demonstrated in FIG. 16, which graphs how the reaction proceeds over time at an operating pressure of 55 bar (data series 160), 69 bar (data series 162), and 83 bar (data series 164) pressure in the absorber versus the time of the experimental run. FIG. 16 shows that the initial rate of reaction is proportional to the system operating pressure. The inventors hypothesize that the operating pressure has two synergistic effects on rates of the reaction-separation experiments. First, the catalytic reaction rate is higher at higher operating pressure. Second, the larger ammonia concentration in the gas stream leaving the reactor raises the driving force for the absorption of ammonia into the $CaCl_2$ absorbent. At longer times, the behavior is more complex, for example, when the conversion curve for the 55 bar operating pressure (data series 160) crosses the conversion curve for the 69 bar operating pressure (data series 162). These complexities probably come from factors like the onset of reverse reaction rate, increased mass transfer resistance, and changes in absorbent structure.

Figure 17A:
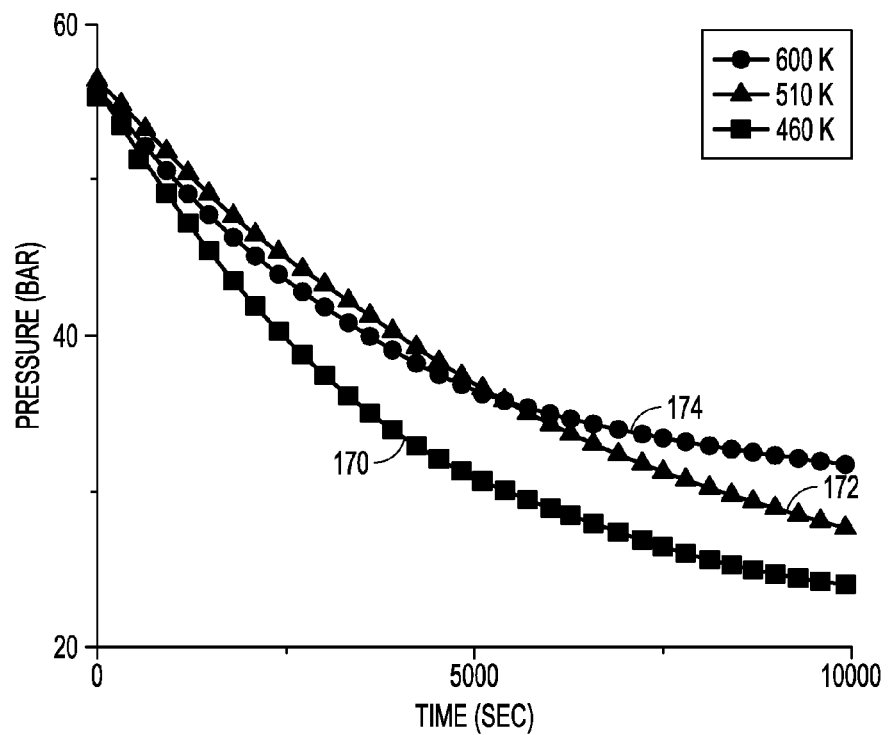
FIG. 17A is a graph showing the conversion rate over time at various absorber temperatures in the same experimental reactor and experimental absorber used to provide the data in FIGS. 14A, 14B, 15, and 16.
Figure 17B:
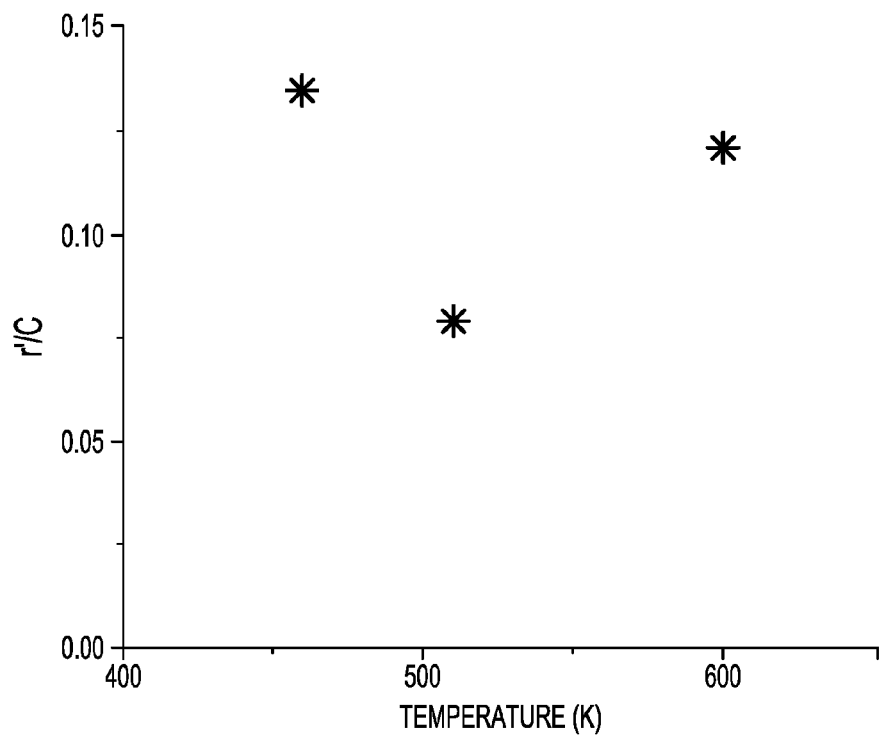
FIG. 17B is a plot of the apparent conversion rate per capacity of the absorber versus the absorber temperature in the same experimental reactor and experimental absorber used to provide the data in FIGS. 14A, 14B, 15, 16, and 17A.

The effect of absorber temperature on the rate of ammonia production may indicate that two competing mechanisms are controlling the absorption of ammonia. First, the diffusion coefficients in the solid $CaCl_2$ increase with temperature. Second, the capacity of the absorbent decreases with temperature (For example, in the literature, the equilibrium absorption capacity of $CaCl_2$ has been found to be 4 moles of ammonia per mole of $CaCl_2$ at 325 K and 1 bar ammonia partial pressure, but only 1.5 moles of ammonia per mole of $CaCl_2$ at 470 K and 1 bar ammonia partial pressure). FIG. 17A graphs how absorption proceeds at absorber temperatures of 460 K (data series 170), 510 K (data series 172), and 600 K (data series 174). FIG. 17A shows that there is no significant effect of temperature on absorption: the rate is greatest at 460 K (data series 170), smaller at 510 K (data series 172), and somewhat larger at 600 K (data series 174). FIG. 17B plots the apparent production rate per unit of absorber capacity on the vertical axis versus absorber temperature on the horizontal axis. The plot in FIG. 17B indicates that the apparent production rate per absorber capacity remains relatively constant regardless of absorber temperature, implying that diffusion and capacity almost exactly counterbalance.

Figure 18A:
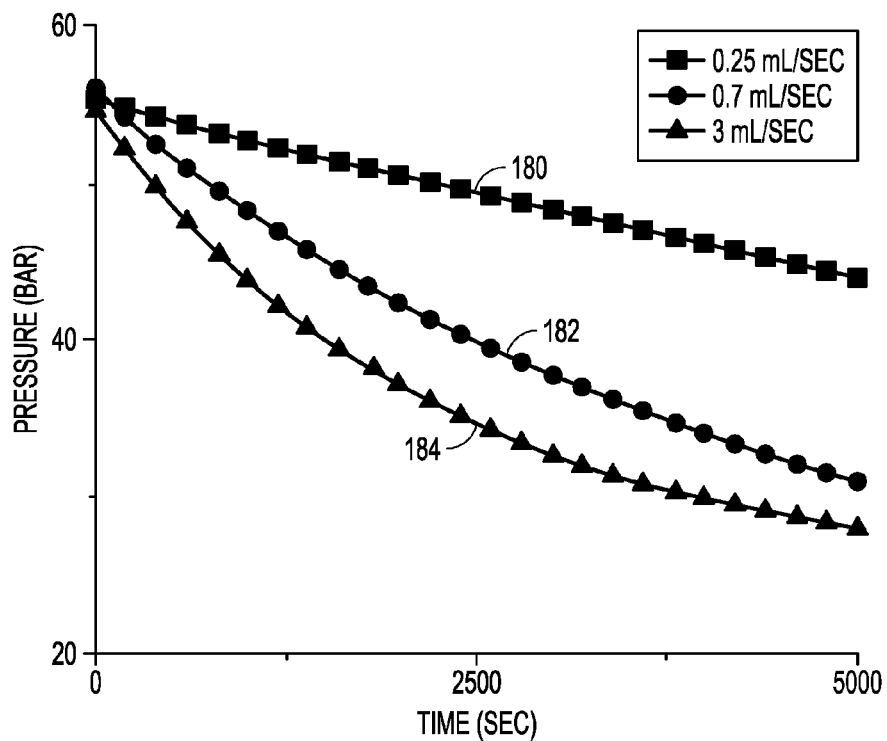
FIG. 18A is a plot of the conversion rate over time at various pumping flow rates in the same experimental reactor and experimental absorber used to provide the data in FIGS. 14A, 14B, 15, 16, 17A, and 17B.
Figure 18B:
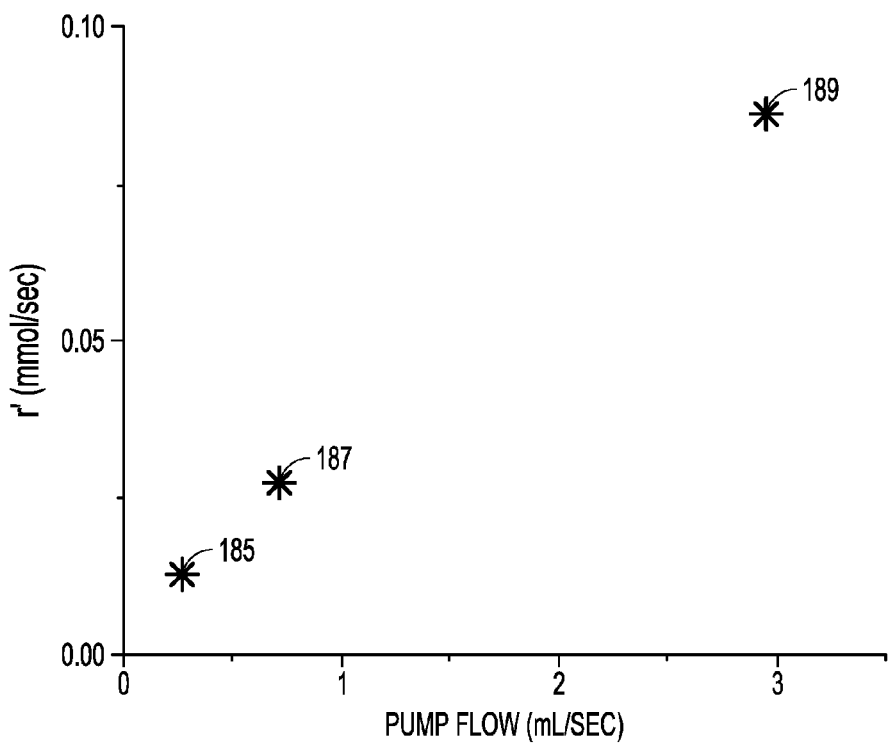
FIG. 18B is a plot of the initial rate of absorption at various pumping flow rates in the same experimental reactor and experimental absorber used to provide the data in FIGS. 14A, 14B. 15, 16, 17A, 17B, and 18A.

It has been found that with the absorber systems described herein, a potentially major factor affecting the total resistance in the system is the fluid velocity in the system, e.g., the flow rate of the recycle pump. This is surprising considering that the flow rate of gas has an insignificant effect on the forward or reverse chemical rate constants. However, it appears that the gas flow rate affects both the absorption resistance and the recycle resistance, as described above with respect to Equation [27]. At the beginning of the test, the packed bed absorber works as a perfect separator. Thus, it has been found that the absorption time constant is equal to zero until the breakthrough point. It seems reasonable to infer, therefore, that the film mass transfer resistance around the particle is not important. It was expected that the resistance to absorption will gain more importance once ammonia breakthrough takes place. As a result, the inventors conjectured that the resistance of the recycle flow, represented by the term $$\frac{1-x_A^*}{m}$$

in Equation [27], would influence the overall rate significantly. FIGS. 18A and 18B demonstrate that this is true, as they show that faster pumping accelerates the process. FIG. 18A plots the progress of ammonia production over time at pumping rates of 0.25 mL/sec (data series 180), 0.7 mL/sec (data series 182), and 3 mL/sec (data series 184). FIG. 18B shows an initial rate (arbitrarily calculated from the initial 1000 seconds of the experiment) of absorption at the same three gas pumping rates: 0.25 mL/second (data point 185), 0.7 mL/sec (data point 187), and 3 mL/min (data point 189). Even increasing the flow rates by a factor of twelve, such as between the 0.25 mL/second pumping rate 180 and the 3 mL/second pumping rate 184, does not yet suggest an asymptote in FIG. 18B.

These results indicated that if nearly complete removal of the ammonia in the absorber could be maintained in the absorber, increasing the recycle flow will decrease the single-pass conversion of ammonia. In other words, when the absorber is used to absorb ammonia from the reactor outlet, faster recycle flow accelerates forward reaction and decelerates reverse reaction due to lower ammonia concentration in the reactor. It should be noted that it is possible that as the recirculation rate increases beyond a certain threshold value, the fast recirculation rate may compromise the reactor and absorber temperatures. For example, in the present experiments, when the recycle pump flow rate was increased to more than 3 mL/second reduced the reactor temperature because of increased heat loss to the gas flowing out of the reactor, which is why none of that data is being presented here.

Figure 19:
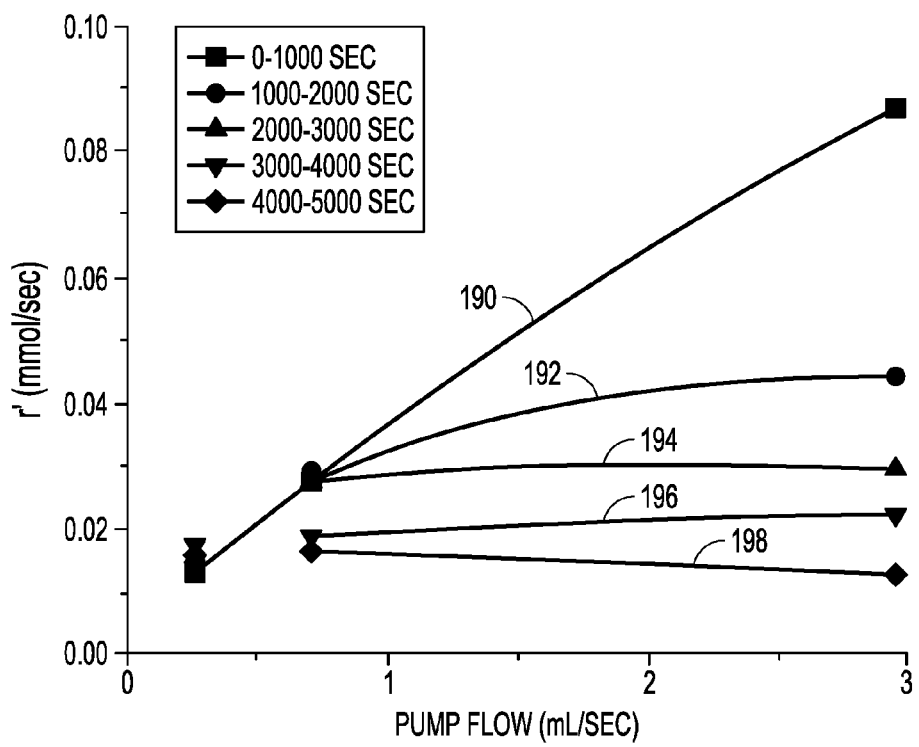
FIG. 19 is a graph showing the production rate versus the pumping flow rate over various time intervals of an absorption cycle in the same experimental reactor and experimental absorber used to provide the data in FIGS. 14A, 14B. 15, 16, 17A, 17B, 18A, and 18B.

FIG. 19 shows the production rates over different time intervals versus the pumping rates. Results suggest that during the initial 1000 seconds (data series 190), the rate resistance due to recycle flow (i.e., $$\frac{1-x_A^*}{m}$$

in Equation [27]) is much larger than the reaction resistance (i.e., $$\left(\frac{1}{k_R V_R}\right)$$

in Equation [27]). Also, during the initial 1000 seconds (data series 190), the $CaCl_2$ absorbent in the regenerated packed bed absorber is essentially completely or substantially completely removing the ammonia, such that the absorption resistance (i.e., $(1/k_{ab}P_tS)$ in Equation [27]) is zero or substantially close to zero. Therefore, the data collected for this EXAMPLE indicate that the recycle flow resistance is controlling in the reaction-separation process during the initial 1000 seconds (data series 190), which leads to the linear increase in the production rate in FIG. 19.

As shown by data series 192 (time interval from 1000-2000 seconds), data series 194 (200-3000 seconds), and data series 196 (3000-4000 seconds), at times from 1000 to 4000 seconds, the absorber's packed bed breakthrough starts to appear, and the absorber is no longer capable of complete removal of the ammonia from the gas stream. By contrast, at longer times in the range of 4000 to 5000 seconds (data series 198), smaller production rates were observed at higher recycle flows. This lower production rate for the 4000-5000 second interval (data series 198) was believed to be attributable to the appearance of the breakthrough point and at least partial exhaustion of the bed. Also, at higher recycle flow rates, the production rate is increased, which led to faster loading of the absorbent. This is consistent with observations of the slower slopes at around 5000 seconds for data series 180, 182, and 184 in FIG. 18A.

Discussion

The results shown above confirm the viability of the reaction-absorption process for the enhanced production of ammonia at significantly lower operating pressures compared to conventional Haber-Bosch processing conditions. For example, in one set of measurements, a conversion of more than 80% conversion was achieved with relatively fast ammonia synthesis rates, which remained substantially unchanged for up to about 5000 seconds. These results suggest that high production rates at pressures as low as 25 bar are viable when ammonia is removed from the system efficiently, as is achievable with the $CaCl_2$ absorbent used in this EXAMPLE. The absorption separates the synthesized ammonia from the reaction environment, and reduces the reverse reaction.

The model summarized in the Theory Section of this EXAMPLE will be used to investigate the rate constants for each unit at different operating condition in order to better understand the resistances to overall ammonia production rate in the system. Table 2 summarizes the complete reaction conditions and calculated times for each unit operation. The first column in Table 2 identifies the experimental category. Columns 2 through 5 identify the reaction conditions, including the operating pressure, reaction temperature, absorption temperature, and pumping flow rate. Columns 6 and 7 give the calculated time constants for the reactor resistance and the recycle resistance obtained according to Equation [27] (i.e., $(1/k_R V_R)$ for the resistance due to chemical reaction and $(1-x^*_A)/m$ for the resistance from the recycle loop), respectively. Table 2 does not include a column showing the calculated time constant for the absorber resistance (i.e. $(1/k_{ab}P_tS)$ in Equation [27]) because, as noted above, during initial operation of the system and before breakthrough of the absorber bed, the absorber is remove all or essentially all of the ammonia from the gas flow such that the absorption time constant is zero. For each experimental trial, the value of each of the three rate constants merit careful consideration, for they are the key by which the process can be improved. The longest time constant corresponds to slowest step in the reaction-separation and hence, controls the overall rate of the process under the conditions studied.

TABLE 2

Experimental Trial Process Conditions

| Variable Being Tested | Trial # | Pressure (bar) | Reactor Temp. (K) | Absorber Temp. (K) | Pump Rate (L/hr) | Reaction Time Constant ($10^{-3}$ hr/mol) | Recycle Time Constant (hr/mol) |
|---|---|---|---|---|---|---|---|
| Absorption History | 1 | 55 | 700 | 460 | 2.5 | 5.8 | 0.18 |
| Reaction Temp. | 2 | 55 | 680 | 460 | 2.5 | 16 | 0.18 |
|  | 3 | 55 | 700 | 460 | 2.5 | 5.8 | 0.18 |
|  | 4 | 55 | 720 | 460 | 2.5 | 2.2 | 0.18 |
|  | 5 | 55 | 740 | 460 | 2.5 | 1.1 | 0.18 |
| Pressure | 6 | 55 | 700 | 460 | 2.5 | 5.8 | 0.18 |
|  | 7 | 69 | 700 | 460 | 2.5 | 5.8 | 0.14 |
|  | 8 | 83 | 700 | 460 | 2.5 | 5.8 | 0.12 |
| Absorption Temp. | 9 | 55 | 700 | 460 | 2.5 | 5.8 | 0.18 |
|  | 10 | 55 | 700 | 510 | 2.5 | 5.8 | 0.18 |
|  | 11 | 55 | 700 | 600 | 2.5 | 5.8 | 0.18 |
| Pumping Flow Rate | 12 | 55 | 700 | 460 | 1 | 5.8 | 0.46 |
|  | 13 | 55 | 700 | 460 | 2.5 | 5.8 | 0.18 |
|  | 14 | 55 | 700 | 460 | 10 | 5.8 | 0.04 |

Table 2 shows that the recycle flow is the rate-controlling step before breakthrough of the packed bed absorber. The time constant for the recycle is 100 times larger than the reaction time constant. Thus, the reactive separation process described herein can be improved significantly by faster recycle flows. However, this is not a trivial change, because controlling the operating parameters of the reaction-separation systems gets difficult.

These results still guide speculation about the design of a small, efficient process which includes the synthesis and simultaneous removal of the ammonia at reduced pressure. In the rate equations, there are three factors that directly affect the reaction rate: the temperature (which affects all the reaction rate constants); the partial pressures of reactants (which influences the forward reaction rate); and the partial pressure of the ammonia (which influences the reverse rates). If ammonia is removed from reaction chamber efficiently, then the disassociation of ammonia through the reverse reaction no longer proceeds rapidly. Thus, respectable rates of reaction can be obtained at reduced pressure if the concentration of ammonia is kept low, such as with efficient separation.

One design change that could be performed to improve performance could be to mix the catalyst and the absorbent in the same bed. However, the catalyst can be poisoned by water and other impurities that may be present on the absorbent. Another design change could be a conventional reactor that has been divided into short segments with absorption beds in between. While high recycle flow rate (which, as described below, has been shown to provide for increased production due to an improved recycle resistance rate constant) may be difficult in such a design, but the promise of such a design is worth further investigation.

Figure 20:
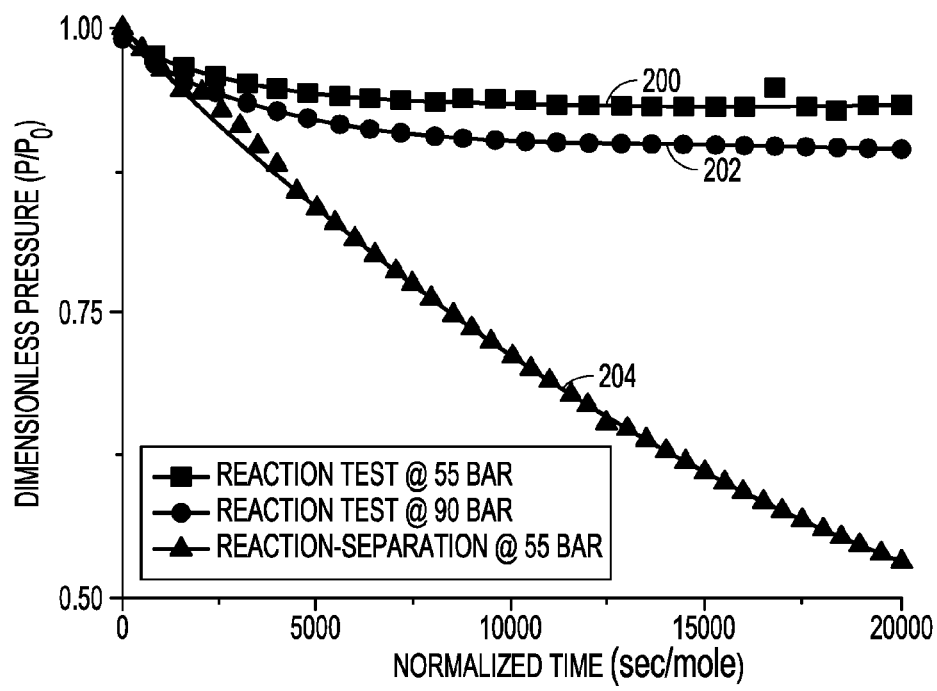
FIG. 20 is a graph of a dimensionless pressure versus a normalized time to compare the apparent production rate over time for an example experimental system that only uses an experimental reactor and not an absorber (such as the experimental setup used to collect the date in FIGS. 12A, 12B, and 13) to the apparent production rate over time for an example experimental system that uses a reactor and an absorber (such as the experimental setup used to collected the date in FIGS. 14A, 14B, 15, 16, 17A, 17B, 18A, 18B, and 19).

FIG. 20 shows a proof-of-the-concept for the viability of enhanced ammonia synthesis at reduced pressure via the reaction-separation processes described herein. In FIG. 20, the dimensionless pressure ($P/P_0$) is plotted versus normalized time $\bar{t}$, which is defined as the time in the experiment divided by the total initial charge in the system. Data series 200 shows a reaction test at 723 K and initial operating pressure of 55 bar. Data series 202 show result for a reaction test at 723 K and initial operating pressure of 90 bar. Data series 204 shows results for a reaction-separation test in which the reaction take place at 723 K, absorption takes place at 460 K, the initial operating pressure is 55 bar, and the recycle pump was set at 0.7 mL/second. The data points are averaged for each 50 seconds. The slopes of these curves represent the apparent rates of ammonia synthesis.

When the absorber is introduced to the batch-recycle-loop system, the rate of production stays comparable to the initial rate seen in the absence of the absorber. The absorber is managing to keep the product concentration above the catalyst low, so the rate is comparable to just the forward rate. FIG. 20 indicates that after a short period, the reaction-separation system achieves substantially faster apparent rates compared to reaction system. While during the initial stage ($\bar{t}$=100 sec/mole), the reaction test at 90 bar (data series 202) achieves the fastest, the reaction test at 55 bar (data series 200) displays a slower rate similar to the rate observed in reaction-separation test (data series 204). However, the apparent rates change significantly after a while ($\bar{t}$>100 seconds/mole). Comparison of the reaction tests at 90 and 55 bar initial pressure (data series 202 and 200, respectively) with the reaction-separation test at 55 bar initial pressure (data series 204) shows that the rates of the reaction tests slow down very quickly while the reaction-separation apparent rate remains substantially unchanged for a substantially longer period of time. For instance, at $\bar{t}$=2500 sec/mole, the apparent rate of the reaction-separation test of data series 204 is four times larger than the apparent rate of the reaction test of data series 202, even though its operating pressure is almost half of that of the test of data series 202 (55 bar versus 90 bar). At $\bar{t}$>5000 sec/mole, the reaction tests of data series 200 and 202 approach equilibrium while the apparent rate of the reaction-separation test of data series 204 is still unchanged at pressures as low as 25 bar.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The terms and expressions which have been employed are used as terms of description and not of limitation, and there is no intention that in the use of such terms and expressions of excluding any equivalents of the features shown and described or portions thereof, but it is recognized that various modifications are possible within the scope of the inventive subject matter claimed. Thus, it should be understood that although the embodiments of the present invention have been specifically disclosed by examples and optional features, modification and variation of the concepts herein disclosed may be resorted to by those of ordinary skill in the art, and that such modifications and variations are considered to be within the scope of the subject matter of the present invention as defined by the appended claims.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for producing ammonia, the system comprising: a reactor configured to receive a nitrogen feed gas ($N_2$) and a hydrogen feed gas ($H_2$), the reactor comprising a catalyst that converts at least a portion of the nitrogen gas and at least a portion of the hydrogen feed gas to ammonia ($NH_3$) to form a reaction mixture comprising the ammonia, unreacted nitrogen feed gas, and unreacted hydrogen feed gas; a feed system to feed the nitrogen feed gas and the hydrogen feed gas to the reactor at a reaction pressure of from about 9 atmospheres to about 100 atmospheres; a reactor control system to control the temperature of the reactor during conversion of the nitrogen feed gas and the hydrogen feed gas to the ammonia, wherein the reactor control system is configured to maintain a reaction temperature of the reaction mixture at from about 330° C. to about 500° C.; an absorbent that selectively absorbs at least a portion of the ammonia from the reaction mixture, wherein the absorbent comprises a porous support structure; an absorbent control system to control one or both of a temperature and a pressure at the absorbent during selective absorption of the ammonia from the reaction mixture; and a recycle line downstream of the absorbent to recycle the unreacted nitrogen feed gas and the unreacted hydrogen feed gas to the reactor.

2. The system of claim 1, further comprising: a product line downstream of the absorbent and separate from the recycle line; and one or more flow control devices to direct gas flow to either the recycle line or the product line; wherein the absorbent control system is configured to cycle between an absorption phase and a desorption phase, wherein the absorbent control system maintains one or both of a first temperature and a first pressure at the absorbent that is conducive to absorption of ammonia into the absorbent during the absorption phase and maintains one or both of a second temperature and a second pressure at the absorbent that is conducive to desorption of ammonia form the absorbent during the desorption phase, and wherein the one or more flow control devices direct the gas flow of unreacted nitrogen feed gas and unreacted hydrogen feed gas to the recycle line during the absorption phase and direct the gas flow of desorbed ammonia to the product line during the desorption phase.

3. The system of claim 2, wherein the absorbent control system maintains the absorbent at the first temperature to provide for absorption of ammonia into the absorbent during the absorption phase and increases a temperature at the absorbent to the second temperature to provide for desorption of ammonia from the absorbent during the desorption phase.

4. The system of claim 3, wherein the first temperature is about 100° C. or lower, and the second temperature is from about 175° C. to about 350° C.

5. The system of claim 2, further comprising: a first set of one or more first absorbers each comprising some of the absorbent; and a second set of one or more second absorbers each comprising some of the absorbent; wherein the absorbent control system cycles between: a first operating state wherein the absorbent control system operates the first set of one or more first absorbers in the absorption phase and the second set of one or more second absorbers in the desorption phase, and a second operating state wherein, the absorbent control system operates the second set of one or more second absorbers in the absorption phase and the first set of one or more first absorbers in the desorption phase.

6. The system of claim 1, wherein the absorbent comprises one or more of magnesium chloride ($MgCl_2$), calcium chloride ($CaCl_2$)), strontium chloride ($SrCl_2$), zinc chloride ($ZnCl_2$), or zinc nitrate ($Zn(NO_3)_2$).

7. The system of claim 1, wherein the absorbent comprises primarily calcium chloride ($CaCl_2$)).

8. The system of claim 1, wherein overall conversion of the nitrogen feed gas and the hydrogen feed gas to ammonia for the system is at least about 40%.

9. The system of claim 1, wherein overall conversion of the nitrogen feed gas and the hydrogen feed gas to ammonia for the system is at least about 90%.

10. A method for producing ammonia, the method comprising:
reacting at least a portion of a nitrogen feed gas ($N_2$) and at least a portion of a hydrogen feed gas ($H_2$) in the presence of a catalyst in a reactor while maintaining a reaction pressure of from about 9 atmospheres to about 100 atmospheres and a reaction temperature of from about 330° C. to about 500° C. to form ammonia ($NH_3$), wherein unreacted nitrogen gas ($N_2$), unreacted hydrogen gas ($H_2$), and the ammonia ($NH_3$) form a reaction mixture; cycling between an absorption phase and a desorption phase, wherein the absorption phase comprises: flowing at least a portion of the reaction mixture to an absorbent comprising a porous support structure while maintaining one or both of an absorption pressure and an absorption temperature at the absorbent to selectively absorb at least a portion of the ammonia from the reaction mixture into the absorbent; and following the selective absorbing, recycling unreacted nitrogen gas and unreacted hydrogen to the reactor; and wherein the desorption phase comprises: changing one or both of the pressure at the absorbent to a desorption pressure or the temperature at the absorbent to a desorption temperature so that at least a portion of ammonia absorbed in the absorbent is desorbed from the absorbent; and withdrawing at least a portion of the ammonia desorbed from the absorbent as an ammonia product stream.

11. The method of claim 10, wherein the absorption temperature is maintained at about 100° C. or lower during the absorption phase.

12. The method of claim 11, wherein the desorption temperature is maintained at about 175° C. or more during the desorption phase.

13. The method of claim 11, wherein the desorption temperature is maintained about 200° C. are more during the desorption phase.

14. The method of claim 10, wherein the desorption temperature is maintained at about 250° C. or more during the desorption phase.

15. The method of claim 10, wherein the absorbent comprises primarily calcium chloride ($CaCl_2$)).

16. The method of claim 10, wherein overall conversion of the nitrogen feed gas and the hydrogen feed gas to ammonia in the ammonia product stream is at least about 40%.

17. The method of claim 10, wherein overall conversion of the nitrogen feed gas and the hydrogen feed gas to ammonia in the ammonia product stream is at least about 90%.

18. The method of claim 10, wherein the absorbent is at least partially contained in a first set of one or more first absorbers each comprising some of the absorbent and in a second set of one or more second absorbers each comprising some of the absorbent; and wherein the cycling between the absorption phase and the desorption phase comprises cycling between a first operation state and a second operation state, wherein the first operation state includes: feeding the reaction mixture to the one or more first absorbers of the first set, controlling the temperature at the absorbent in the one or more first absorbers to be at the absorption temperature or controlling the pressure in the one or more first absorbers to be at the absorption pressure, or both, controlling the temperature at the absorbent in the one or more second absorbers to be at the desorption temperature or controlling the pressure in the one or more second absorbers to be at the desorption pressure, or both, so that at least a portion of ammonia absorbed in the absorbent of the one or more second absorbers is desorbed, and withdrawing at least a portion of the ammonia desorbed from the absorbent in the one or more second absorbers as the ammonia product stream; and wherein the second operation state includes: feeding the reaction mixture to the one or more second absorbers of the second set, controlling the temperature at the absorbent in the one or more second absorbers to be at the absorption temperature or controlling the pressure in the one or more second absorbers to be at the absorption pressure, or both, controlling the temperature at the absorbent in the one or more first absorbers to be at the desorption temperature or controlling the pressure in the one or more first absorbers to be at the desorption pressure, or both, so that at least a portion of ammonia absorbed in the absorbent in the one or more first absorbers is desorbed, and withdrawing at least a portion of the ammonia desorbed from the absorbent in the one or more first absorbers as the ammonia product stream.

19. The method of claim 18, further comprising switching between the first operation state and the second operation state, wherein the switching comprises: ceasing flow of the reaction mixture to the first set of one or more first absorbers and directing the reaction mixture to the second set of one or more second absorbers; heating the absorbent in the one or more first absorbers to the desorption temperature or reducing the pressure in the one or more first absorbers to the desorption pressure, or both; and cooling the absorbent in the one or more second absorbers to the absorption temperature or increasing the pressure in the one or more second absorbers to the absorption pressure, or both.

20. The method of claim 18, further comprising switching between the second operation state and the first operation state, wherein the switching comprises: ceasing flow of the reaction mixture to the second set of one or more second absorbers and directing the reaction mixture to the first set of one or more first absorbers; heating the absorbent in the one or more second absorbers to the desorption temperature or reducing the pressure in the one or more second absorbers to the desorption pressure, or both; and cooling the absorbent in the one or more first absorbers to the absorption temperature or increasing the pressure in the one or more first absorbers to the absorption pressure, or both.

* * * * *